United States Patent
Ome et al.

(10) Patent No.: US 10,011,759 B2
(45) Date of Patent: Jul. 3, 2018

(54) METHOD FOR RECOVERY OF GASEOUS HYDROCARBONS AND/OR LIQUID HYDROCARBONS FROM UNDERGROUND

(71) Applicant: TORAY INDUSTRIES, INC., Tokyo (JP)

(72) Inventors: Hiroyuki Ome, Nagoya (JP); Tatsuya Nagano, Tokai (JP); Yoshitake Takahashi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/911,809

(22) PCT Filed: Sep. 4, 2014

(86) PCT No.: PCT/JP2014/073304
§ 371 (c)(1),
(2) Date: Feb. 12, 2016

(87) PCT Pub. No.: WO2015/041060
PCT Pub. Date: Mar. 26, 2015

(65) Prior Publication Data
US 2016/0194549 A1    Jul. 7, 2016

(30) Foreign Application Priority Data

Sep. 20, 2013  (JP) .................................. 2013-194879

(51) Int. Cl.
| | |
|---|---|
| C09K 8/588 | (2006.01) |
| C08L 67/04 | (2006.01) |
| C09K 8/035 | (2006.01) |
| C09K 8/508 | (2006.01) |
| C09K 8/68 | (2006.01) |
| C09K 8/88 | (2006.01) |
| E21B 43/26 | (2006.01) |

(52) U.S. Cl.
CPC .............. *C09K 8/588* (2013.01); *C08L 67/04* (2013.01); *C09K 8/035* (2013.01); *C09K 8/508* (2013.01); *C09K 8/68* (2013.01); *C09K 8/88* (2013.01); *E21B 43/26* (2013.01); *C09K 2208/08* (2013.01)

(58) Field of Classification Search
None
See application file for complete search history.

(56) References Cited

U.S. PATENT DOCUMENTS

| | | | | |
|---|---|---|---|---|
| 2004/0261995 | A1* | 12/2004 | Nguyen ................. | C09K 8/80 166/279 |
| 2005/0205265 | A1* | 9/2005 | Todd ..................... | E21B 33/12 166/376 |
| 2007/0043434 | A1* | 2/2007 | Meerkin ................ | A61F 2/82 623/1.49 |
| 2008/0093073 | A1* | 4/2008 | Bustos ................... | C09K 8/68 166/279 |
| 2008/0139417 | A1 | 6/2008 | Alsyed et al. | |
| 2008/0182762 | A1* | 7/2008 | Huang ................... | C09K 8/68 507/213 |
| 2008/0236823 | A1 | 10/2008 | Willberg et al. | |
| 2010/0288500 | A1* | 11/2010 | Carlson ................. | D04H 1/42 166/308.1 |

FOREIGN PATENT DOCUMENTS

| | | |
|---|---|---|
| JP | 2012-1620 A | 1/2012 |
| WO | WO 2013/090652 A1 | 6/2013 |

OTHER PUBLICATIONS

Tsuji; "Poly(lactide) Stereocomplexes: Formation, Structure, Properties, Degradation, and Applications"; Macromolecular Bioscience; May 20, 2005, p. 569-597.*
International Search Report for PCT/JP2014/073304 dated Dec. 9, 2014.
Written Opinion of the International Searching Authority for PCT/JP2014/073304 (PCT/ISA/237) dated Dec. 9, 2014.

* cited by examiner

*Primary Examiner* — Angela M DiTrani
*Assistant Examiner* — Andrew Sue-Ako
(74) *Attorney, Agent, or Firm* — Birch, Stewart, Kolasch & Birch, LLP

(57) ABSTRACT

Provided is a method of recovering gaseous hydrocarbons and/or liquid hydrocarbons from underground, characterized by using a polylactic acid) resin comprising an a poly-L-lactic acid component and a poly-D-lactic acid component and having a heat of fusion at 190° C. or higher, as measured by differential scanning calorimetry, of 20 J/g or more, wherein the underground is at a depth of 3,000 m or deeper. According to the recovery method of the present invention, shale gas, shale oil, and the like can be recovered efficiently.

22 Claims, No Drawings

METHOD FOR RECOVERY OF GASEOUS HYDROCARBONS AND/OR LIQUID HYDROCARBONS FROM UNDERGROUND

TECHNICAL FIELD

The present invention relates to a method of recovering gaseous hydrocarbons and/or liquid hydrocarbons from underground in an efficient and eco-friendly manner.

BACKGROUND ART

In recent years, non-conventional fossil resources such as shale gas and shale oil have been actively recovered. The recovery of shale gas and shale oil is carried out through three steps: vertical drilling, horizontal drilling, and hydraulic fracturing. The hydraulic fracturing is a technique in which fractures are created in formations in a well by water pressure to form highly permeable channels, and as treating liquids in this technique, various materials are used according to the function. The materials added are desirably environmentally friendly materials, and biodegradable plastics have also been used.

Poly(lactic acid) is a practically melt-moldable polymer having a melting point of around 170° C., and because of having biodegradable characteristics, it has been developed as a biodegradable plastic that will be degraded after use in the natural environment to be emitted as carbon dioxide gas and water. In addition, poly(lactic acid) itself is made of a renewable resource (biomass) originated from carbon dioxide and water, and, therefore, carbon dioxide, if emitted after use, has no effect on the amount of carbon dioxide in the global environment. Such a carbon-neutral nature has received attention in recent years, and poly(lactic acid) is expected to be used as an eco-friendly material. Furthermore, since lactic acid, a monomer of poly(lactic acid), has been produced at low cost by fermentation methods using microorganisms, poly(lactic acid) is being studied as a material alternative to general-purpose polymers made of petroleum-based plastics.

PRIOR ART DOCUMENTS

Patent Documents

As an application of poly(lactic acid), the use in recovery of shale gas and shale oil is disclosed (Patent Documents 1 to 4).

Patent Document 1: U.S. Pat. No. 7,833,950
Patent Document 2: WO 2013/052285
Patent Document 3: WO 2013/090652
Patent Document 4: U.S. Pat. No. 7,786,051

SUMMARY OF THE INVENTION

Problems to be Solved by the Invention

However, since the temperature of formations where shale gas and shale oil exist increases as the depth increases, the temperature can be higher than the melting point of poly (lactic acid) when the depth reaches several thousand meters, in which case it is difficult to use the normal poly(lactic acid) used in Patent Documents 1 to 4.

The present invention has been developed in view of the foregoing and aims to provide a method of recovering natural gas and crude oil from underground using a poly (lactic acid) stereocomplex, and particularly to enable recovery at very deep areas.

Means for Solving the Problems

To solve these problems, the method of recovering gaseous hydrocarbons and/or liquid hydrocarbons from underground according to the present invention has the following structure:

A method of recovering gaseous hydrocarbons and/or liquid hydrocarbons from underground, which method uses a poly(lactic acid) resin comprising an a poly-L-lactic acid component and a poly-D-lactic acid component and having a heat of fusion at 190° C. or higher, as measured by differential scanning calorimetry, of 20 J/g or more.

In the method of recovering gaseous hydrocarbons and/or liquid hydrocarbons from underground according to the present invention, the poly(lactic acid) resin for use preferably has a decrease rate (A) of weight average molecular weight, as measured in hot water at 150° C. and 30 MPa, satisfying Expression (1) below.

$$0.1 < A(\%/min) < 2 \tag{1}$$

In the method of recovering gaseous hydrocarbons and/or liquid hydrocarbons from underground according to the present invention, the poly(lactic acid) resin for use preferably has a thermal weight loss rate (B), as measured under anhydrous conditions at 190° C., satisfying Expression (2) below.

$$0.01 < B(wt\%/hr) < 5 \tag{2}$$

In the method of recovering gaseous hydrocarbons and/or liquid hydrocarbons from underground according to the present invention, the underground is preferably at a depth of 3,000 m or deeper.

The underground is preferably a shale formation having a formation temperature of 150° C. or higher.

In the method of recovering gaseous hydrocarbons and/or liquid hydrocarbons from underground according to the present invention, the poly(lactic acid) resin is preferably used as a lost circulation material.

In the method of recovering gaseous hydrocarbons and/or liquid hydrocarbons from underground according to the present invention, the poly(lactic acid) resin is preferably used as at least one of a proppant flow improver and a proppant antisettling agent.

In the method of recovering gaseous hydrocarbons and/or liquid hydrocarbons from underground according to the present invention, the poly(lactic acid) resin is preferably used as a channel forming agent in a proppant or a channel forming agent solubilizer in a proppant.

In the method of recovering gaseous hydrocarbons and/or liquid hydrocarbons from underground according to the present invention, the poly(lactic acid) resin is preferably a poly(lactic acid) stereocomplex having a degree of stereocomplexation (Sc) satisfying Expression (3) below.

$$Sc = \Delta Hh/(\Delta Hl + \Delta Hh) \times 100 > 80 \tag{3}$$

where $\Delta Hh$ is a heat of fusion (J/g) of stereocomplex crystals as measured by differential scanning calorimetry by increasing the temperature at a temperature increasing rate of 20° C./min; and $\Delta Hl$ is a heat of fusion (J/g) of crystals of poly-L-lactic acid alone and crystals of poly-D-lactic acid alone as measured by differential scanning calorimetry by increasing the temperature at a temperature increasing rate of 20° C./min.

In the method of recovering gaseous hydrocarbons and/or liquid hydrocarbons from underground according to the present invention, the poly(lactic acid) resin for use preferably has a weight average molecular weight of 100,000 to 250,000 and the poly(lactic acid) resin is used in the form of an aqueous dispersion, wherein a retention time in the form of an aqueous dispersion in the formation, for a formation temperature where gaseous hydrocarbons and/or liquid hydrocarbons are recovered, satisfy Expression (4) below.

$$323,000 \times e^{-0.0618 \times Ts} < H < 42,000,000 \times e^{-0.0745 \times Ts} \quad (4)$$

where

Ts is a formation temperature (° C.); and

H is a retention time in the form of an aqueous dispersion (min).

In the method of recovering gaseous hydrocarbons and/or liquid hydrocarbons from underground according to the present invention, the poly(lactic acid) resin is preferably used in the form of a liquid hydrocarbon dispersion, and the poly(lactic acid) resin for use preferably has a weight average molecular weight of 100,000 to 250,000, a decrease rate (A) of weight average molecular weight, as measured in hot water at 150° C. and 30 MPa, satisfying Expression (1) below, and a thermal weight loss rate (B), as measured under anhydrous conditions at 190° C., satisfying Expression (2) below.

$$0.1 < A(\%/\text{min}) < 2 \quad (1)$$

$$0.01 < B(\text{wt }\%/\text{hr}) < 5 \quad (2)$$

In the method of recovering gaseous hydrocarbons and/or liquid hydrocarbons from underground according to the present invention, the poly(lactic acid) resin is preferably used in the fiber form.

In the method of recovering gaseous hydrocarbons and/or liquid hydrocarbons from underground according to the present invention, the poly(lactic acid) resin is preferably a poly(lactic acid) resin in the fiber form and the fiber having a length of 1 to 5 cm and a fineness of 100 to 1,000 dtex.

In the method of recovering gaseous hydrocarbons and/or liquid hydrocarbons from underground according to the present invention, the poly(lactic acid) resin is preferably in the fiber form and the fiber having a length of 1 to 5 cm and a fineness of 100 to 1,000 dtex, and 1 to 10 parts by weight of the poly(lactic acid) resin is preferably mixed with 100 parts by weight of a fracturing fluid composed mainly of water and then injected underground together with the fracturing fluid to prevent the fracturing fluid before reaching the shale formation from being lost into formations.

In the method of recovering gaseous hydrocarbons and/or liquid hydrocarbons from underground according to the present invention, the poly(lactic acid) resin is preferably a poly(lactic acid) resin in the fiber form and the fiber having a length of 1 to 10 mm and a fineness of 0.3 to 5 dtex.

In the method of recovering gaseous hydrocarbons and/or liquid hydrocarbons from underground according to the present invention, the poly(lactic acid) resin is preferably in the fiber form and the fiber having a length of 1 to 10 mm and a fineness of 0.3 to 5 dtex, and 1 to 6 parts by weight of the poly(lactic acid) resin is preferably mixed with 100 parts by weight of a fracturing fluid composed mainly of water and a proppant and then injected together with the fracturing fluid into fractures in the shale formation.

In the method of recovering gaseous hydrocarbons and/or liquid hydrocarbons from underground according to the present invention, the poly(lactic acid) resin is preferably a poly(lactic acid) resin in the fiber form containing polyamide inside.

In the method of recovering gaseous hydrocarbons and/or liquid hydrocarbons from underground according to the present invention, the poly(lactic acid) resin is preferably used in the powder form.

Effects of the Invention

According to the present invention, natural gas and crude oil can be recovered from underground efficiently, and, in particular, the invention is useful for recovery at very deep areas.

DESCRIPTION OF EMBODIMENTS

Embodiments for carrying out the present invention will now be described in detail. It should be noted that the following embodiments are not intended to limit the scope of the present invention.

The present invention is a method of recovering gaseous hydrocarbons and/or liquid hydrocarbons from underground, the method being characterized by using a poly (lactic acid) resin comprising a poly-L-lactic acid component and a poly-D-lactic acid component.

<Poly-L-Lactic Acid Component and Poly-D-Lactic Acid Component>

The poly-L-lactic acid component herein refers to a polymer composed mainly of L-lactic acid, specifically, a polymer containing L-lactic acid units in an amount of 70 mol % or more. The amount of L-lactic acid units is more preferably 80 mol % or more, still more preferably 90 mol % or more, particularly preferably 95 mol % or more, and most preferably 98 mol % or more.

The poly-D-lactic acid component refers to a polymer composed mainly of D-lactic acid, specifically, a polymer containing D-lactic acid units in an amount of 70 mol % or more. The amount of D-lactic acid units is more preferably 80 mol % or more, still more preferably 90 mol % or more, particularly preferably 95 mol % or more, and most preferably 98 mol % or more.

In the present invention, the poly-L-lactic acid composed of L-lactic acid units or the poly-D-lactic acid composed of D-lactic acid units may include any other component units without adversely affecting the properties of a resulting poly(lactic acid) resin composition. Examples of the component units other than L-lactic acid units and D-lactic acid units include polycarboxylic acids, polyalcohols, hydroxycarboxylic acids, and lactones: specifically, polycarboxylic acids such as succinic acid, adipic acid, sebacic acid, fumaric acid, terephthalic acid, isophthalic acid, 2,6-naphthalenedicarboxylic acid, 5-sodium sulfoisophthalic acid, and 5-tetrabutylphosphonium sulfoisophthalic acid, and derivatives thereof; polyalcohols such as ethylene glycol, propylene glycol, butanediol, pentanediol, hexanediol, octanediol, neopentyl glycol, glycerin, trimethylolpropane, pentaerythritol, polyalcohol prepared by addition of ethylene oxide or propylene oxide to trimethylolpropane or pentaerythritol, aromatic polyalcohol prepared by addition reaction of bisphenol with ethylene oxide, diethylene glycol, triethylene glycol, polyethylene glycol, and polypropylene glycol, and derivatives thereof; hydroxycarboxylic acids such as glycolic acid, 3-hydroxybutyric acid, 4-hydroxybutyric acid, 4-hydroxyvaleric acid, and 6-hydroxycaproic acid; and lactones such as glycolide, ε-caprolactone glycolide, ε-caprolactone, β-propiolactone, δ-butyrolactone, β-or γ-butyrolactone, pivalolactone, and δ-valerolactone.

The weight average molecular weights of the poly-L-lactic acid component and the poly-D-lactic acid component for use in the present invention are not limited. Preferably, the weight average molecular weight of one of the poly-L-lactic acid component or the poly-D-lactic acid component is 50,000 to 300,000, and the weight average molecular weight of the other is 10,000 to 200,000. More preferably, the weight average molecular weight of one is 70,000 to 250,000, and the weight average molecular weight of the other is 20,000 to 150,000. Particularly preferably, the weight average molecular weight of one is 100,000 to 230,000, and the weight average molecular weight of the other is 30,000 to 120,000.

For the poly-L-lactic acid component and the poly-D-lactic acid component for use in the present invention, the ratio of the higher weight average molecular weight to the lower weight average molecular weight is not limited but preferably 1.1 or greater but less than 30, more preferably 1.5 or greater but less than 20, and most preferably 2 or greater but less than 10. The combination of the weight average molecular weights of the poly-L-lactic acid and the poly-D-lactic acid is preferably selected as appropriate such that the weight average molecular weight after mixing is 80,000 or more.

The poly(lactic acid) resin for use in the present invention preferably satisfies both the requirements that the weight average molecular weights of the poly-L-lactic acid component and the poly-D-lactic acid component be each in the above ranges and that the weight average molecular weight ratio of the poly-L-lactic acid component to the poly-D-lactic acid component be in the above range.

The weight average molecular weight is a value determined by gel permeation chromatography (GPC) against poly(methyl methacrylate) standards using hexafluoroisopropanol or chloroform as a solvent.

The lactide amount and the oligomer amount in the poly-L-lactic acid component or the poly-D-lactic acid component are preferably each 5% or less, more preferably 3% or less, and particularly preferably 1% or less. The lactic acid amount in the poly-L-lactic acid or the poly-D-lactic acid is preferably 2% or less, more preferably 1% or less, and particularly preferably 0.5% or less.

The acid value of the poly-L-lactic acid component or the poly-D-lactic acid component for use in the present invention is not limited, and the acid value of one of the poly-L-lactic acid component or the poly-D-lactic acid component is preferably 120 eq/ton or less, more preferably 60 eq/ton or less, still more preferably 40 eq/ton or less, and particularly preferably 30 eq/ton or less. The acid value of the other one of the poly-L-lactic acid component or the poly-D-lactic acid component is preferably 500 eq/ton or less, more preferably 300 eq/ton or less, still more preferably 150 eq/ton or less, and particularly preferably 100 eq/ton or less.

The poly-L-lactic acid component or the poly-D-lactic acid component for use in the present invention may be produced by any method, and conventional methods for producing poly(lactic acid) can be used. Specifically, methods are known, such as the two-step lactide method in which L-lactide or D-lactide, a cyclic dimer, is once produced using L-lactic acid or D-lactic acid as a raw material, and then ring-opening polymerization is carried out, and the one-step direct polymerization method in which the raw material is subjected to direct polycondensation in a solvent or a nonsolvent, and any production method may be used.

In producing poly-L-lactic acid or poly-D-lactic acid using the ring-opening polymerization method, the water amount in the reaction system is preferably 4 mol % or less based on the total amount of L-lactide and D-lactide in order to produce a high-molecular-weight product. The water amount is more preferably 2 mol % or less, particularly preferably 0.5 mol % or less. The water amount is a value determined by coulometric titration using the Karl-Fischer method.

Examples of the polymerization catalyst in producing the poly-L-lactic acid component or the poly-D-lactic acid component by the ring-opening polymerization method include metal catalysts and acid catalysts. Examples of the metal catalysts include tin compounds, titanium compounds, lead compounds, zinc compounds, cobalt compounds, iron compounds, lithium compounds, and rare earth compound. Preferred examples of the types of the compounds include metal alkoxides, halogen metal compounds, organic carboxylates, carbonates, sulfates, and oxides. Specific examples of the tin compounds include tin powder, tin(II) chloride, tin(IV) chloride, tin(II) bromide, tin(IV) bromide, ethoxytin(II), t-butoxytin(IV), isopropoxytin(IV), stannous acetate, tin (IV) acetate, stannous octoate, tin(II) laurate, tin(II) myristate, tin(II) palmitate, tin(II) stearate, tin(II) oleate, tin(II) linoleate, tin(II) acetylacetonate, tin(II) oxalate, tin(II) lactate, tin(II) tartrate, tin(II) pyrophosphate, tin(II) p-phenolsulfonate, tin(II) bis(methanesulfonate), tin(II) sulfate, tin(II) oxide, tin(IV) oxide, tin(II) sulfide, tin(IV) sulfide, dimethyltin(IV) oxide, methylphenyltin(IV) oxide, dibutyltin(IV) oxide, dioctyltin(IV) oxide, diphenyltin(IV) oxide, tributyltin oxide, triethyltin(IV) hydroxide, triphenyltin(IV) hydroxide, tributyltin hydride, monobutyltin(IV) oxide, tetramethyltin(IV), tetraethyltin(IV), tetrabutyltin(IV), dibutyldiphenyltin(IV), tetraphenyltin(IV), tributyltin(IV) acetate, triisobutyltin(IV) acetate, triphenyltin(IV) acetate, dibutyltin diacetate, dibutyltin dioctoate, dibutyltin(IV) dilaurate, dibutyltin(IV) maleate, dibutyltin bis(acetylacetonate), tributyltin(IV) chloride, dibutyltin dichloride, monobutyltin trichloride, dioctyltin dichloride, triphenyltin (IV) chloride, tributyltin sulfide, tributyltin sulfate, tin(II) methanesulfonate, tin(II) ethanesulfonate, tin(II) trifluoromethanesulfonate, ammonium hexachlorostannate(IV), dibutyltin sulfide, diphenyltin sulfide, triethyltin sulfate, and tin(II) phthalocyanine. Specific examples of the titanium compounds include titanium methoxide, titanium propoxide, titanium isopropoxide, titanium butoxide, titanium isobutoxide, titanium cyclohexide, titanium phenoxide, titanium chloride, titanium diacetate, titanium triacetate, titanium tetraacetate, and titanium(IV) oxide. Specific examples of the lead compounds include diisopropoxylead(II), lead monochloride, lead acetate, lead(II) octoate, lead(II) isooctoate, lead(II) isononanoate, lead(II) laurate, lead(II) oleate, lead(II) linoleate, lead naphthenate, lead(II) neodecanoate, lead oxide, and lead(II) sulfate. Specific examples of the zinc compounds include zinc powder, methylpropoxy zinc, zinc chloride, zinc acetate, zinc(II) octoate, zinc naphthenate, zinc carbonate, zinc oxide, and zinc sulfate. Specific examples of the cobalt compounds include cobalt chloride, cobalt acetate, cobalt(II) octoate, cobalt(II) isooctoate, cobalt(II) isononanoate, cobalt(II) laurate, cobalt(II) oleate, cobalt(II) linoleate, cobalt naphthenate, cobalt(II) neodecanoate, cobalt(II) carbonate, cobalt(II) sulfate, and cobalt (II) oxide. Specific examples of the iron compounds include iron(II) chloride, iron(II) acetate, iron(II) octoate, iron naphthenate, iron(II) carbonate, iron(II) sulfate, and iron(II) oxide. Specific examples of the lithium compounds include lithium propoxide, lithium chloride, lithium acetate, lithium octoate, lithium naphthenate, lithium carbonate, dilithium sulfate, and lithium oxide. Specific examples of the rare earth compounds include triisopropoxyeuropium(III), triisopropoxyneodymium(III), triisopropoxylanthanum, triisopropoxysamarium(III), triisopropoxyyttrium, isopropoxyyttrium, dysprosium chloride, europium chloride, lanthanum chloride, neodymium chloride, samarium chloride, yttrium chloride, dysprosium(III) triacetate, europium(III) triacetate, lanthanum acetate, neodymium triacetate, samarium acetate, yttrium triacetate, dysprosium(III) carbonate, dysprosium (IV) carbonate, europium(II) carbonate, lanthanum carbonate, neodymium carbonate, samarium(II) carbonate, samarium(III) carbonate, yttrium carbonate, dysprosium sulfate, europium(II) sulfate, lanthanum sulfate, neodymium sulfate, samarium sulfate, yttrium sulfate, europium dioxide, lanthanum oxide, neodymium oxide, samarium(III) oxide, and yttrium oxide. Other examples of the metal catalysts include potassium compounds such as potassium isopropoxide, potassium chloride, potassium acetate, potassium octoate, potassium naphthenate, potassium t-butyl carbonate, potassium sulfate, and potassium oxide; copper compounds such as copper(II) diisopropoxide, copper(II) chloride, copper(II) acetate, copper octoate, copper naphthenate, copper(II) sulfate, and dicopper carbonate; nickel compounds such as nickel chloride, nickel acetate, nickel octoate, nickel carbonate, nickel(II) sulfate, and nickel oxide; zirconium compounds such as tetraisopropoxyzirconium(IV), zirconium trichloride, zirconium acetate, zirconium octoate, zirconium naphthenate, zirconium(II) carbonate, zirconium(IV) carbonate, zirconium sulfate, and zirconium(II) oxide; antimony compounds such as tri isopropoxyantimony, antimony (III) fluoride, antimony(V) fluoride, antimony acetate, and antimony(III) oxide; magnesium compounds such as magnesium, magnesium diisopropoxide, magnesium chloride, magnesium acetate, magnesium lactate, magnesium carbonate, magnesium sulfate, and magnesium oxide; calcium compounds such as diisopropoxycalcium, calcium chloride, calcium acetate, calcium octoate, calcium naphthenate, calcium lactate, and calcium sulfate; aluminum compounds such as aluminum, aluminum isopropoxide, aluminum chloride, aluminum acetate, aluminum octoate, aluminum sulfate, and aluminum oxide; germanium compounds such as germanium, tetraisopropoxygermane, and germanium(IV) oxide; manganese compounds such as triisopropoxymanganese(III), manganese trichloride, manganese acetate, manganese(II) octoate, manganese(II) naphthenate, and manganese(II) sulfate; and bismuth compounds such as bismuth (III) chloride, bismuth powder, bismuth(III) oxide, bismuth acetate, bismuth octoate, and bismuth neodecanoate. Still other preferred examples of the metal catalysts include compounds composed of two or more kinds of metallic elements, such as sodium stannate, magnesium stannate, potassium stannate, calcium stannate, manganese stannate, bismuth stannate, barium stannate, strontium stannate, sodium titanate, magnesium titanate, aluminum titanate, potassium titanate, calcium titanate, cobalt titanate, zinc titanate, manganese titanate, zirconium titanate, bismuth titanate, barium titanate, and strontium titanate.

The acid catalyst may be either a Bronsted acid, which is a proton donor, or a Lewis acid, which is an electron-pair acceptor, and may be either an organic acid or an inorganic acid. Specific examples of the acid catalyst include monocarboxylic acid compounds such as formic acid, acetic acid, propionic acid, heptanoic acid, octanoic acid, octylic acid, nonanoic acid, isononanoic acid, trifluoroacetic acid, and trichloroacetic acid; dicarboxylic acid compounds such as oxalic acid, succinic acid, maleic acid, tartaric acid, and malonic acid; tricarboxylic acid compounds such as citric acid and tricarballylic acid; sulfonic acid compounds such as aromatic sulfonic acids including benzenesulfonic acid, n-butylbenzenesulfonic acid, n-octylbenzenesulfonic acid, n-dodecylbenzenesulfonic acid, pentadecylbenzenesulfonic acid, 2,5-dimethylbenzenesulfonic acid, 2,5-dibutylbenzenesulfonic acid, o-aminobenzenesulfonic acid, m-aminobenzenesulfonic acid, p-aminobenzenesulfonic acid, 3-amino 4-hydroxybenzenesulfonic acid, 5-amino-2-methylbenzenesulfonic acid, 3,5-diamino-2,4,6-trimethylbenzenesulfonic acid, 2,4-dinitrobenzenesulfonic acid, p-chlorobenzenesulfonic acid, 2,5-dichlorobenzenesulfonic acid, p-phenolsulfonic acid, cumene sulfonic acid, xylenesulfonic acid, o-cresolsulfonic acid, m-cresolsulfonic acid, p-cresolsulfonic acid, p-toluenesulfonic acid, 2-naphthalenesulfonic acid, 1-naphthalenesulfonic acid, isopropylnaphthalenesulfonic acid, dodecylnaphthalenesulfonic acid, dinonylnaphthalenesulfonic acid, dinonylnaphthalenedisulfonic acid, 1,5-naphthalenedisulfonic acid, 2,7-naphthalenedisulfonic acid, 4,4-biphenyldisulfonic acid, anthraquinone-2-sulfonic acid, m-benzenedisulfonic acid, 2,5-diamino-1,3-benzenedisulfonic acid, aniline-2,4-disulfonic acid, anthraquinone-1,5-disulfonic acid, and polystyrene sulfonic acid, aliphatic sulfonic acids including methanesulfonic acid, ethanesulfonic acid, 1-propanesulfonic acid, n-octylsulfonic acid, pentadecylsulfonic acid, trifluoromethanesulfonic acid, trichloromethanesulfonic acid, 1,2-ethanedisulfonic acid, 1,3-propanedisulfonic acid, aminomethanesulfonic acid, and 2-aminoethanesulfonic acid, alicyclic sulfonic acids including cyclopentanesulfonic acid, cyclohexanesulfonic acid, camphorsulfonic acid, and 3-cyclohexylaminopropanesulfonic acid; acidic amino acids such as aspartic acid and glutamic acid; ascorbic acid; retinoic acid; phosphoric acid compounds such as phosphoric acid, metaphosphoric acid, phosphorus acid, hypophosphorous acid, polyphosphoric acid, phosphoric acid monoesters including monododecyl phosphate and monooctadecyl phosphate, phosphoric acid diesters including didodecyl phosphate and dioctadecyl phosphate, phosphorus acid monoesters, and phosphorus acid diesters; boric acid; hydrochloric acid; and sulfuric acid. The form of the acid catalyst is not limited and may be either a solid acid catalyst or a liquid acid catalyst. Examples of the solid acid catalyst include natural minerals such as acid clay, kaolinite, bentonite, montmorillonite, talc, zirconium silicate, and zeolite; oxides such as silica, alumina, titania, and zirconia; oxide complexes such as silica alumina, silica magnesia, silica boria, alumina boria, silica titania, and silica zirconia; chlorinated alumina; fluorinated alumina; and positive ion exchange resins.

The amount of the polymerization catalyst added in the ring-opening polymerization method is not limited but preferably 0.001 part by weight to 2 parts by weight based on 100 parts by weight of raw materials used (e.g., L-lactic acid, D-lactic acid), particularly preferably 0.001 part by weight to 1 part by weight. When the amount of the catalyst is in this preferred range, the polymerization time is effectively reduced, and, in addition, the final resulting polylactic acid block copolymer tends to have a large molecular weight. When two or more catalysts are used in combination, the total amount of the catalysts is preferably in the above range.

The timing of addition of the polymerization catalyst in the ring-opening polymerization method is not limited, and the catalyst is preferably added after the lactide is melted by heating because the catalyst is uniformly dispersed in the system to increase the polymerization activity.

In contrast, preferred examples of the polymerization catalyst in producing the poly-L-lactic acid component or the poly-D-lactic acid component using the direct polymerization method include metal catalysts and acid catalysts. As the polymerization catalyst, the catalysts listed as a polymerization catalyst in producing the poly-L-lactic acid component or the poly-D-lactic acid component by the ring-opening polymerization method can be used.

In the present invention, in view of the molecular weight of the poly(lactic acid) component produced, tin compounds, titanium compounds, antimony compounds, rare earth compounds, and acid catalysts are preferred, and in view of the melting point of the poly(lactic acid) produced, tin compounds, titanium compounds, and sulfonic acid compounds are more preferred. Furthermore, in view of the thermal stability of the poly(lactic acid) produced, in the case of metal catalysts, tin-based organic carboxylates and tin-based halogen compounds are preferred, and in particular, stannous acetate, stannous octoate, and tin(II) chloride are more preferred; and in the case of acid catalysts, mono- and disulfonic acid compounds are preferred, and methanesulfonic acid, ethanesulfonic acid, propanesulfonic acid, propanedisulfonic acid, naphthalenedisulfonic acid, and 2-aminoethanesulfonic acid are more preferred. The catalyst may be used alone or in combination of two or more, and in view of increasing the polymerization activity, the combined use of two or more catalysts is preferred. To successfully prevent coloring, it is preferable to use one or more catalysts selected from tin compounds and/or one or more catalysts selected from sulfonic acid compounds. In terms of higher productivity, the combined use of stannous acetate and/or stannous octoate and at least one of methanesulfonic acid, ethanesulfonic acid, propanedisulfonic acid, naphthalenedisulfonic acid, and 2-aminoethanesulfonic acid is more preferred, and the combined use of stannous acetate and/or stannous octoate and at least one of methanesulfonic acid, ethanesulfonic acid, propanedisulfonic acid, and 2-aminoethanesulfonic acid is more preferred.

The amount of the polymerization catalyst added is not limited but preferably 0.001 part by weight to 2 parts by weight based on 100 parts by weight of raw materials used (e.g., L-lactic acid, D-lactic acid), particularly preferably 0.001 part by weight to 1 part by weight. When the amount of the catalyst is less than 0.001 part by weight, the effect of reducing the polymerization time is reduced, and when the amount of the catalyst is more than 2 parts by weight, the final resulting poly(lactic acid) component tends not to have a large molecular weight. When two or more catalysts are used in combination, the total amount of the catalysts is preferably in the above range. In the case where one or more catalysts selected from tin compounds and/or one or more catalysts selected from sulfonic acid compounds are used in combination, to maintain high polymerization activity and successfully prevent coloring, the weight ratio of the tin compounds to the sulfonic acid compounds is preferably 1:1 to 1:30, and in terms of high productivity, the weight ratio is more preferably 1:2 to 1:15.

The timing of addition of the polymerization catalyst is not limited. Particularly when polymerization is carried out by the direct polymerization method, the acid catalyst is preferably added, in terms of high productivity, to the raw materials or before dehydration of the raw materials, and the metal catalyst is preferably added after dehydration of the raw materials to increase the polymerization activity.

When solid state polymerization is performed after the direct polymerization for the purpose of increasing the molecular weight, the poly-L-lactic acid component or the poly-D-lactic acid component may be in any form such as a block, a film, a pellet, and powder, and to allow the solid state polymerization to proceed efficiently, it is preferable to use a pellet or powder. Examples of the method of forming the poly-L-lactic acid component or the poly-D-lactic acid component into pellets include a method in which a mixture is extruded into a strand and pelletized and a method in which a mixture is extruded into water and pelletized using an underwater pelletizer. Examples of the method of forming the poly-L-lactic acid component or the poly-D-lactic acid component into powder include pulverization using a pulverizer such as a mixer, a blender, a ball mill, or a hammer mill. This solid state polymerization step may be carried out by any method such as the batch method or the continuous method. For a reaction vessel, reactors such as a stirred tank reactor, a mixer-type reactor, and a column reactor can be used, and these reactors can be used in combination of two or more.

When the solid state polymerization step is carried out, the poly-L-lactic acid component or the poly-D-lactic acid component after the direct polymerization is preferably crystallized. In the present invention, in the case where the poly-L-lactic acid component or the poly-D-lactic acid component is in a crystallized state, crystallization of the poly-L-lactic acid component or the poly-D-lactic acid component is not necessarily required when the solid state polymerization step is carried out, but the crystallization can further improve the efficiency in the solid state polymerization.

The method of crystallization is not limited, and any known method can be used. Examples of the method include holding the poly-L-lactic acid component or the poly-D-lactic acid component in the gas phase or in the liquid phase at a crystallization temperature and cooling and solidifying the poly-L-lactic acid component or the poly-D-lactic acid component while drawing or shearing it, and in view of ease of operation, holding in the gas phase or in the liquid phase at a crystallization temperature is preferred.

The crystallization temperature is not limited as long as it is in the temperature range higher than the glass transition temperature and lower than the melting point of the poly-L-lactic acid component or the poly-D-lactic acid component mixed above. More preferably, the crystallization temperature is in the range of 70° C. to 110° C.

The crystallization is preferably carried out under vacuum or under a stream of inert gas such as dry nitrogen.

The time for carrying out the crystallization is not limited. Three hours or more is sufficient for the crystallization, and 5 hours or more is preferred.

The temperature for carrying out the solid state polymerization step is preferably not higher than the melting point of the poly-L-lactic acid component or the poly-D-lactic acid component, specifically, 100° C. to 170° C. To allow the solid state polymerization to proceed efficiently, the temperature is more preferably 110° C. to 165° C., most preferably 120° C. to 160° C.

To shorten the reaction time of the solid state polymerization, it is preferable to increase the temperature stepwise or continuously as the reaction proceeds. The temperature conditions in increasing the temperature stepwise during the solid state polymerization is preferably such that the temperature is increased as follows: 120° C. to 130° C. for 1 hour to 15 hours in a first stage, 135° C. to 145° C. for 1 hour to 15 hours in a second stage, and 150° C. to 170° C. for 10 hours to 30 hours in a third stage; more preferably such that the temperature is increased as follows: 120° C. to 130° C. for 2 hours to 12 hours in the first stage, 135° C. to 145° C.

for 2 hours to 12 hours in the second stage, and 150° C. to 170° C. for 10 hours to 25 hours in the third stage. The temperature conditions in increasing the temperature continuously during the solid state polymerization are preferably such that the temperature is increased continuously from an initial temperature of 130° C. to 150° C. at a rate of 1 to 5° C./min to 150° C. to 170° C. Combining the stepwise temperature increase with the continuous temperature increase is also preferred to allow the solid state polymerization to proceed efficiently.

The solid state polymerization step is preferably carried out under vacuum or under a stream of inert gas such as dry nitrogen. The degree of vacuum in the solid state polymerization under vacuum is preferably 150 Pa or lower, more preferably 75 Pa or lower, and particularly preferably 20 Pa or lower. The flow rate in the solid state polymerization under a stream of inert gas is preferably in the range of 0.1 to 2,000 (mL/min) per 1 g of the mixture, more preferably in the range of 0.5 to 1,000 (mL/min), and particularly preferably in the range of 1.0 to 500 (mL/min).

<Poly(Lactic Acid) Resin>

The poly(lactic acid) resin of the present invention includes a poly-L-lactic acid component and a poly-D-lactic acid component. The poly(lactic acid) resin may contain a polylactic acid block copolymer composed of a poly-L-lactic acid segment composed mainly of L-lactic acid and a poly-D-lactic acid segment composed mainly of D-lactic acid, or may be a poly(lactic acid) stereocomplex that includes a poly-L-lactic acid component and a poly-D-lactic acid component and is obtained by mixing poly-L-lactic acid with poly-D-lactic acid.

The poly(lactic acid) resin of the present invention, as a result of stereocomplex formation, has a melting point derived from stereocomplex crystals in the range of 190° C. to 230° C., and, therefore, has high heat resistance compared to poly(lactic acid) homopolymers. The melting point derived from stereocomplex crystals is preferably in the range of 200° C. to 230° C., more preferably in the temperature range of 205° C. to 230° C., and particularly preferably in the temperature range of 210° C. to 230° C. The poly(lactic acid) resin may also have a small melting peak derived from crystals of poly-L-lactic acid alone and crystals of poly-D-lactic acid alone in the range of 150° C. to 185° C.

The poly(lactic acid) resin of the present invention has a heat of fusion at 190° C. or higher, as measured by differential scanning calorimetry (DSC), of 20 J/g or more, preferably 30 J/g or more. The heat of fusion can be measured by heating the poly(lactic acid) resin from room temperature to 250° C. at a temperature increasing rate of 20° C./min. When the heat of fusion at 190° C. or higher is less than 20 J/g, the heat resistance may be disadvantageously insufficient for underground use.

The poly(lactic acid) resin according to the present invention preferably has a weight loss rate, as determined by thermo-gravimetry analysis (TGA) after heating the poly (lactic acid) resin composition at 240° C. for 30 minutes, of less than 1.0%.

From the viewpoint of heat resistance, the poly(lactic acid) resin preferably has a degree of stereocomplexation (Sc) of 80% or more, more preferably in the range of 85% to 100%, and particularly preferably 90% to 100%. The degree of stereocomplexation (Sc) herein refers to the proportion of stereocomplex crystals in all the crystals in the poly(lactic acid). The degree of stereocomplexation (Sc) can be calculated from the ratio of crystals of poly(lactic acid) alone to stereocomplex crystals as measured by X-ray diffraction, but in the present invention, the value determined from the heat of fusion measured by differential scanning calorimetry using a differential scanning calorimeter is employed. Specifically, the degree of stereocomplexation (Sc) can be calculated by Expression (5) below, where $\Delta Hl$ is a heat of fusion of crystals of poly-L-lactic acid alone and crystals of poly-D-lactic acid alone, and $\Delta Hh$ is a heat of fusion of stereocomplex crystals, as measured with a differential scanning calorimeter by increasing the temperature from 30° C. to 250° C. at a temperature increasing rate of 20° C./min.

$$Sc=\Delta Hh/(\Delta Hl+\Delta Hh)\times 100 \qquad (5)$$

In the present invention, the poly(lactic acid) resin preferably has a cooling crystallization temperature (Tc) of 130° C. or higher. The cooling crystallization temperature (Tc) herein refers to a crystallization temperature derived from poly(lactic acid) crystals as measured with a differential scanning calorimeter by increasing the temperature from 30° C. to 250° C. at a temperature increasing rate of 20° C./min, keeping the temperature constant at 250° C. for 3 minutes, and then decreasing the temperature at a cooling rate of 20° C./min. The cooling crystallization temperature (Tc) is more preferably 132° C. or higher, particularly preferably 135° C. or higher.

In the present invention, the weight average molecular weight of the poly(lactic acid) resin is not limited but preferably in the range of 100,000 or more but less than 300,000 in terms of moldability and mechanical properties. The weight average molecular weight is more preferably in the range of 120,000 or more but less than 280,000, still more preferably in the range of 130,000 or more but less than 270,000, and particularly preferably in the range of 140,000 or more but less than 260,000.

The polydispersity of the poly(lactic acid) resin is preferably in the range of 1.5 to 3.0 in terms of mechanical properties. The polydispersity is more preferably in the range of 1.8 to 2.7, particularly preferably 2.0 to 2.4 in terms of moldability and mechanical properties.

The weight average molecular weight and the polydispersity are values determined by gel permeation chromatography (GPC) against poly(methyl methacrylate) standards using hexafluoroisopropanol or chloroform as a solvent.

In the present invention, when the poly(lactic acid) resin contains a polylactic acid block copolymer, the average sequence length of the polylactic acid block copolymer is preferably 20 or greater, more preferably 25 or greater, and particularly preferably 30 or greater in terms of mechanical properties of the resulting molded product. The average sequence length of the polylactic acid block copolymer can be calculated by Expression (6) below, where I(a) is an integral value of a carbon peak attributed to carbonyl carbon at about 170.1 to 170.3 (ppm), and I(b) is an integral value of a carbon peak attributed to carbonyl carbon at about 169.8 to 170.0 (ppm), as determined by $^{13}$C—NMR measurement.

$$\text{Average sequence length}=I(a)/I(b) \qquad (6)$$

In the present invention, the ratio of the total weight of the poly-L-lactic acid component to the total weight of the poly-D-lactic acid component in the poly(lactic acid) resin is preferably 90:10 to 10:90, more preferably 80:20 to 20:80, and particularly preferably 75:25 to 25:75. When the ratio of the total weight of the poly-L-lactic acid component to the total weight of the poly-D-lactic acid component is in this preferred range, stereocomplexes tend to be formed, resulting in a sufficiently large increase in the melting point of the poly(lactic acid) resin.

In the present invention, when the poly(lactic acid) resin contains a polylactic acid block copolymer, the total number of the segment composed of L-lactic acid units and the segment composed of D-lactic acid units contained in one molecule of the polylactic acid block copolymer is preferably 3 or greater because a poly(lactic acid) stereocomplex having a high melting point tends to be formed, resulting in a molded article with high heat resistance. The total number of the segment composed of L-lactic acid units and the segment composed of D-lactic acid units contained in one molecule is more preferably 5 or greater, particularly preferably 7 or greater.

In the present invention, when the poly(lactic acid) resin contains a polylactic acid block copolymer, the polylactic acid block copolymer preferably has thermal properties satisfying Expression (7) below.

$$1 < (Tm-Tms)/(Tme-Tm) < 1.8 \qquad (7)$$

where

Tm represents the melting point derived from stereocomplex crystals that is observed in a temperature range of 190° C. to lower than 250° C., as measured with a differential scanning calorimeter by increasing the polylactic acid block copolymer from 30° C. to 250° C. at a temperature increasing rate of 40° C./min;

Tms represents the melting start temperature of stereocomplex crystals that is observed in a temperature range of 190° C. to lower than 250° C., as measured with a differential scanning calorimeter by increasing the polylactic acid block copolymer from 30° C. to 250° C. at a temperature increasing rate of 40° C./min; and Tme represents the melting end temperature of stereocomplex crystals that is observed in a temperature range of 190° C. to lower than 250° C., as measured with a differential scanning calorimeter by increasing the polylactic acid block copolymer from 30° C. to 250° C. at a temperature increasing rate of 40° C./min.

A more preferred range is $1 < (Tm-Tms)/(Tme-Tm) < 1.6$, and the range of $1 < (Tm-Tms)/(Tme-Tm) < 1.4$ is particularly preferred.

When the polylactic acid block copolymer contained in the poly(lactic acid) resin satisfies Expression (7) above, the polylactic acid block copolymer has a high melting point and high heat resistance as well as excellent melt moldability.

The method of producing the polylactic acid block copolymer is not limited, and any conventional method of producing poly(lactic acid) can be used. Specific examples of the method include the lactide method in which either L-lactide or D-lactide, a cyclic dimer produced from a raw material lactic acid, is subjected to ring-opening polymerization in the presence of a catalyst, and a lactide, an optical isomer of the poly(lactic acid), is further added and the resulting mixture is subjected to ring-opening polymerization to give a polylactic acid block copolymer including a poly-L-lactic acid component and a poly-D-lactic acid component in one molecule (Production Method 1); a method in which raw materials are each subjected to direct polymerization or ring-opening polymerization via lactide to provide a poly-L-lactic acid component and a poly-D-lactic acid component, and then the poly-L-lactic acid component and the poly-D-lactic acid component obtained are mixed and subjected to solid state polymerization to give a polylactic acid block copolymer including the poly-L-lactic acid component and the poly-D-lactic acid component in one molecule (Production Method 2); a method in which a poly-L-lactic acid component and a poly-D-lactic acid component are melt kneaded for a long time at a temperature not lower than the melting end temperature of the component having a higher melting point, whereby a segment of L-lactic acid units and a segment of D-lactic acid units are transesterified to give a polylactic acid block copolymer including the poly-L-lactic acid component and the poly-D-lactic acid component in one molecule (Production Method 3); and a method in which a polyfunctional compound(s) is/are mixed with a poly-L-lactic acid component and a poly-D-lactic acid component and allowed to react, whereby the poly-L-lactic acid component and the poly-D-lactic acid component are covalently bonded through the polyfunctional compound(s) to give a polylactic acid block copolymer (Production Method 4). Any of the production methods may be used, and the method in which a poly-L-lactic acid component and a poly-D-lactic acid component are mixed and then subjected to solid state polymerization is preferred because the total number of the segment composed of L-lactic acid units and the segment composed of D-lactic acid units contained in one molecule of a polylactic acid block copolymer is 3 or greater, resulting in a polylactic acid block copolymer having all of the heat resistance, crystallinity, and mechanical properties.

The methods of polymerizing a polylactic acid block copolymer will now be described in detail.

(Production Method 1)

One example of the method of producing a polylactic acid block copolymer by ring-opening polymerization is a method in which one of L-lactide or D-lactide is subjected to ring-opening polymerization in the presence of a catalyst, and then the other lactide, an optical isomer, is added and the resulting mixture is subjected to ring-opening polymerization to give a polylactic acid block copolymer.

From the viewpoint of heat resistance and transparency of the resulting molded product, the ratio of the weight average molecular weight of the segment composed of L-lactic acid units to the weight average molecular weight of the segment composed of D-lactic acid units contained in one molecule of the polylactic acid block copolymer obtained by ring-opening polymerization is preferably 2 or greater but less than 30, more preferably 3 or greater but less than 20, and particularly preferably 5 or greater but less than 15. The ratio of the weight average molecular weight of the segment composed of L-lactic acid units to the weight average molecular weight of the segment composed of D-lactic acid units can be controlled by controlling the weight ratio of L-lactide to D-lactide used in polymerizing the polylactic acid block copolymer.

To improve the heat resistance and crystallinity, the total number of the segment composed of L-lactic acid units and the segment composed of D-lactic acid units contained in one molecule of the polylactic acid block copolymer obtained by ring-opening polymerization is preferably 3 or greater, more preferably 5 or greater, and particularly preferably 7 or greater. The weight average molecular weight per segment is preferably 2,000 to 50,000, more preferably 4,000 to 45,000, and particularly preferably 5,000 to 40,000.

To improve the crystallinity and the melting point of the polylactic acid block copolymer, the optical purity of the L-lactide and D-lactide used in the ring-opening polymerization method is preferably 90% ee or more, more preferably 95% ee or more, and particularly preferably 98% ee or more.

When the polylactic acid block copolymer is produced by the ring-opening polymerization method, the water amount in the reaction system is preferably 4 mol % or less based on the total amount of L-lactide and D-lactide in order to produce a high-molecular-weight product. The water amount is more preferably 2 mol % or less, particularly preferably 0.5 mol % or less. The water amount is a value determined by coulometric titration using the Karl-Fischer method.

Examples of the polymerization catalyst in producing the polylactic acid block copolymer by the ring-opening polymerization method include metal catalysts and acid catalysts. As the polymerization catalyst, the catalysts listed as a polymerization catalyst in producing poly-L-lactic acid or poly-D-lactic acid by the ring-opening polymerization method can be used.

In the present invention, in view of the molecular weight of the poly(lactic acid) produced by the ring-opening polymerization method, metal catalysts are preferred as the polymerization catalyst in the ring-opening polymerization. In particular, tin compounds, titanium compounds, antimony compounds, and rare earth compounds are more preferred, and in view of the melting point of the poly(lactic acid) produced by the ring-opening polymerization method, tin compounds and titanium compounds are still more preferred. Furthermore, in view of the thermal stability of the poly(lactic acid) produced by the ring-opening polymerization method, tin-based organic carboxylates and tin-based halogen compounds are preferred, and in particular, stannous acetate, stannous octoate, and tin(II) chloride are more preferred.

The amount of the polymerization catalyst added in the ring-opening polymerization method is not limited but preferably 0.001 part by weight to 2 parts by weight based on 100 parts by weight of raw materials used (e.g., L-lactic acid, D-lactic acid), particularly preferably 0.001 part by weight to 1 part by weight. When the amount of the catalyst is in this preferred range, the polymerization time is effectively reduced, and, in addition, the final resulting polylactic acid block copolymer tends to have a large molecular weight. When two or more catalysts are used in combination, the total amount of the catalysts is preferably in the above range.

The timing of addition of the polymerization catalyst in the ring-opening polymerization method is not limited, and the catalyst is preferably added after the lactide is melted by heating because the catalyst is uniformly dispersed in the system to increase the polymerization activity.

(Production Method 2)

Next, the method in which a poly-L-lactic acid component and a poly-D-lactic acid component are mixed and then subjected to solid state polymerization to give a polylactic acid block copolymer will be described. In this production method, the poly-L-lactic acid component and the poly-D-lactic acid component can be produced by either the ring-opening polymerization method or the direct polymerization method.

When a poly-L-lactic acid component and a poly-D-lactic acid component are mixed and then subjected to solid state polymerization to give a polylactic acid block copolymer, to increase the weight average molecular weight and the degree of stereocomplexation after the solid state polymerization, one of the poly-L-lactic acid component or the poly-D-lactic acid component preferably has a weight average molecular weight of 50,000 to 300,000, and the other preferably has a weight average molecular weight of 10,000 to 200,000. More preferably, the weight average molecular weight of one is 70,000 to 250,000, and the weight average molecular weight of the other is 20,000 to 150,000. Particularly preferably, the weight average molecular weight of one is 100,000 to 230,000, and the weight average molecular weight of the other is 30,000 to 120,000. The combination of the weight average molecular weights of the poly-L-lactic acid and the poly-D-lactic acid is preferably selected as appropriate such that the weight average molecular weight after mixing is 90,000 or more.

Furthermore, for the weight average molecular weights of the poly-L-lactic acid component and the poly-D-lactic acid component in the present invention, preferably, the weight average molecular weight of one of the poly-L-lactic acid component or the poly-D-lactic acid component is 60,000 to 300,000, and the weight average molecular weight of the other is 10,000 to 100,000. More preferably, the weight average molecular weight of one is 100,000 to 270,000, and the weight average molecular weight of the other is 20,000 to 80,000. Still more preferably, the weight average molecular weight of one is 125,000 to 255,000, and the weight average molecular weight of the other is 25,000 to 65,000. Particularly preferably, the weight average molecular weight of one is 150,000 to 240,000, and the weight average molecular weight of the other is 30,000 to 45,000.

The ratio of the weight average molecular weights of the poly-L-lactic acid component and the poly-D-lactic acid component for use in the present invention is not limited but preferably 1.1 or greater but less than 30. The ratio of the weight average molecular weights is more preferably 1.5 or greater but less than 20, most preferably 2 or greater but less than 10. The combination of the weight average molecular weights of the poly-L-lactic acid and the poly-D-lactic acid is preferably selected as appropriate such that the weight average molecular weight after mixing is 80,000 or more.

The poly(lactic acid) resin for use in the present invention preferably satisfies both the requirements that the weight average molecular weights of the poly-L-lactic acid component and the poly-D-lactic acid component be each in the above ranges and that the weight average molecular weight ratio of the poly-L-lactic acid component to the poly-D-lactic acid component be in the above range.

The weight average molecular weight is a value determined by gel permeation chromatography (GPC) against poly(methyl methacrylate) standards using hexafluoroisopropanol or chloroform as a solvent.

The poly-L-lactic acid and the poly-D-lactic acid for use in the present invention preferably satisfies both the requirements that the weight average molecular weights of the poly-L-lactic acid component and the poly-D-lactic acid component be each in the above ranges and that the weight average molecular weight ratio of the poly-L-lactic acid component to the poly-D-lactic acid component be 2 or greater but less than 30.

The lactide amount and the oligomer amount in the poly-L-lactic acid or the poly-D-lactic acid are preferably each 5% or less, more preferably 3% or less, and particularly preferably 1% or less. The lactic acid amount in the poly-L-lactic acid or the poly-D-lactic acid is preferably 2% or less, more preferably 1% or less, and particularly preferably 0.5% or less.

The acid value of the poly-L-lactic acid component or the poly-D-lactic acid component to be mixed is not limited, and the acid value of one of the poly-L-lactic acid component or the poly-D-lactic acid component is preferably 120 eq/ton or less, more preferably 60 eq/ton or less, still more preferably 40 eq/ton or less, and particularly preferably 30 eq/ton or less. The acid value of the other one of the poly-L-lactic acid component or the poly-D-lactic acid component is preferably 500 eq/ton or less, more preferably 300 eq/ton or less, still more preferably 150 eq/ton or less, and particularly preferably 100 eq/ton or less.

In producing the poly-L-lactic acid component or the poly-D-lactic acid component using the ring-opening polymerization method, the water amount in the reaction system is preferably 4 mol % or less based on the total amount of L-lactide and D-lactide in order to produce a high-molecular-weight product. The water amount is more preferably 2 mol % or less, particularly preferably 0.5 mol % or less. The water amount is a value determined by coulometric titration using the Karl-Fischer method.

Examples of the polymerization catalyst in producing the poly-L-lactic acid component or the poly-D-lactic acid component by the ring-opening polymerization method include the same metal catalysts and the acid catalysts as in Production Method 1.

The amount of the polymerization catalyst added in the ring-opening polymerization method is not limited but preferably 0.001 part by weight to 2 parts by weight based on 100 parts by weight of raw materials used (e.g., L-lactic acid, D-lactic acid), particularly preferably 0.001 part by weight to 1 part by weight. When the amount of the catalyst is in this preferred range, the polymerization time is effectively reduced, and, in addition, the final resulting polylactic acid block copolymer tends to have a large molecular weight. When two or more catalysts are used in combination, the total amount of the catalysts is preferably in the above range.

The timing of addition of the polymerization catalyst in the ring-opening polymerization method is not limited, and the catalyst is preferably added after the lactide is melted by heating because the catalyst is uniformly dispersed in the system to increase the polymerization activity.

Examples of the polymerization catalyst in producing the poly-L-lactic acid component or the poly-D-lactic acid component using the direct polymerization method include metal catalysts and acid catalysts. As the polymerization catalyst, the catalysts listed as a polymerization catalyst in producing the poly-L-lactic acid component or the poly-D-lactic acid component by the ring-opening polymerization method can be used.

In view of the molecular weight of the poly(lactic acid) produced using the direct polymerization method, tin compounds, titanium compounds, antimony compounds, rare earth compounds, and acid catalysts are preferred, and in view of the melting point of the poly(lactic acid) produced, tin compounds, titanium compounds, and sulfonic acid compounds are more preferred. Furthermore, in view of the thermal stability of the poly(lactic acid) produced, in the case of metal catalysts, tin-based organic carboxylates and tin-based halogen compounds are preferred, and in particular, stannous acetate, stannous octoate, and tin(II) chloride are more preferred; and in the case of acid catalysts, mono- and disulfonic acid compounds are preferred, and methanesulfonic acid, ethanesulfonic acid, propanesulfonic acid, propanedisulfonic acid, naphthalenedisulfonic acid, and 2-aminoethanesulfonic acid are more preferred. The catalyst may be used alone or in combination of two or more, and in view of increasing the polymerization activity, the combined use of two or more catalysts is preferred. To successfully prevent coloring, it is preferable to use one or more catalysts selected from tin compounds and/or one or more catalysts selected from sulfonic acid compounds. In terms of higher productivity, the combined use of stannous acetate and/or stannous octoate and at least one of methanesulfonic acid, ethanesulfonic acid, propanedisulfonic acid, naphthalenedisulfonic acid, and 2-aminoethanesulfonic acid is more preferred, and the combined use of stannous acetate and/or stannous octoate and at least one of methanesulfonic acid, ethanesulfonic acid, propanedisulfonic acid, and 2-aminoethanesulfonic acid is more preferred.

The amount of the polymerization catalyst added is not limited but preferably 0.001 part by weight to 2 parts by weight based on 100 parts by weight of raw materials used (e.g., L-lactic acid, D-lactic acid), particularly preferably 0.001 part by weight to 1 part by weight. When the amount of the catalyst is in this preferred range, the effect of reducing the polymerization time is sufficient, and the final resulting polylactic acid block copolymer tends to have a large molecular weight. When two or more catalysts are used in combination, the total amount of the catalysts is preferably in the above range, and in the case where one or more catalysts selected from tin compounds and/or one or more catalysts selected from sulfonic acid compounds are used in combination, to maintain high polymerization activity and successfully prevent coloring, the weight ratio of the tin compounds to the sulfonic acid compounds is preferably 1:1 to 1:30, and in terms of high productivity, the weight ratio is more preferably 1:2 to 1:15.

The timing of addition of the polymerization catalyst is not limited. Particularly when poly(lactic acid) is polymerized by the direct polymerization method, the acid catalyst is preferably added, in terms of high productivity, to the raw materials or before dehydration of the raw materials, and the metal catalyst is preferably added after dehydration of the raw materials to increase the polymerization activity.

In the present invention, when the poly-L-lactic acid component and the poly-D-lactic acid component are mixed and the resulting mixture is subjected to solid state polymerization to give a polylactic acid block copolymer, the degree of stereocomplexation (Sc) as a result of mixing the poly-L-lactic acid component and the poly-D-lactic acid component is preferably in the range over 60% immediately before the solid state polymerization. The degree of stereocomplexation (Sc) is more preferably in the range of 70% to 99%, particularly preferably in the range of 80% to 95%. In other words, the degree of stereocomplexation (Sc) determined by Expression (5) above preferably satisfies Expression (3) above.

$$Sc=\Delta Hh/(\Delta Hl+\Delta Hh)\times 100>60 \tag{3}$$

The poly-L-lactic acid component and the poly-D-lactic acid component used for the mixing may or may not be crystallized. The poly-L-lactic acid component and the poly-D-lactic acid component in the crystallized state may be mixed, or the poly-L-lactic acid component and the poly-D-lactic acid component in the molten state may be mixed. Specific examples of the method of crystallizing the poly-L-lactic acid component and the poly-D-lactic acid component used for the mixing include a method in which the components are held in the gas phase or in the liquid phase at a crystallization treatment temperature, and a method in which the poly-L-lactic acid component and the poly-D-lactic acid component in the molten state are retained under shear in a melter at a temperature between the melting point −50° C. and the melting point +20° C., and a method in which the poly-L-lactic acid component and the poly-D-lactic acid component in the molten state are retained under pressure in a melter at a temperature between the melting point −50° C. and the melting point +20° C.

The crystallization treatment temperature is not limited as long as it is in the temperature range higher than the glass transition temperature and lower than the melting point of the poly(lactic acid) having a lower melting point selected from the poly-L-lactic acid component or the poly-D-lactic acid component mixed above. More preferably, the crystallization treatment temperature is in the range between the heating crystallization temperature and the cooling crystallization temperature as measured with a differential scanning calorimeter in advance.

The crystallization in the gas phase or in the liquid phase may be carried out under reduced pressure, normal pressure, or increased pressure. The time for carrying out the crystallization in the gas phase or in the liquid phase is not limited, and the crystallization is sufficiently achieved in 3 hours or in 2 hours.

In the above-described method in which the poly-L-lactic acid component and the poly-D-lactic acid component are crystallized by applying shear or pressure in a melter, the melter is not limited as long as it can apply shear or pressure. For example, polymerization tanks, kneaders, Banbury mixers, single screw extruders, twin screw extruders, and injection molding machines can be used, and single screw extruders and twin screw extruders are preferred.

In the method in which crystallization is carried out by applying shear or pressure in a melter, the crystallization treatment temperature is preferably in the range of the melting point −50° C. to the melting point +20° C., the melting point being that of the poly-L-lactic acid component and the poly-D-lactic acid to be mixed. The crystallization temperature is more preferably in the range of the melting point −40° C. to the melting point, particularly preferably in the temperature range of the melting point −30° C. to the melting point −5° C. The temperature of the melter is typically set at the melting point +at least 20° C. so that the resin melts to exhibit favorable flowability. When the temperature of the melter is in this preferred range, crystallization proceeds while appropriate flowability is maintained, and, in addition, crystals produced are unlikely to remelt. The melting point refers to a temperature at the top of the crystal melting peak as determined by differential scanning calorimetry by increasing the temperature from 30° C. to 250° C. at a temperature increasing rate of 20° C./min.

The crystallization treatment time is preferably 0.1 minute to 10 minutes, more preferably 0.3 to 5 minutes, and particularly preferably in the range of 0.5 minute to 3 minutes. When the crystallization treatment time is in this preferred range, crystallization sufficiently proceeds, and, in addition, thermal decomposition is unlikely to occur.

Applying shear in a melter tends to orient the molecules in a molten resin, as a result of which the crystallization rate can be significantly increased. The shear rate at this time is preferably in the range of 10 to 400 (/sec). When the shear rate is in this preferred range, the crystallization rate is sufficiently high, and, in addition, thermal decomposition due to shear heating is unlikely to occur.

Crystallization tends to be promoted also when pressure is applied, and, in particular, the pressure in the range of 0.05 to 10 (MPa) is preferred because it can provide a crystallized poly(lactic acid) having both favorable flowability and crystallinity. When the pressure is in this preferred range, the crystallization rate is sufficiently increased.

Furthermore, a treatment by applying both shear at a shear rate of 10 to 400 (/sec) and a pressure of 0.05 to 10 (MPa) is particularly preferred because the crystallization rate is further increased.

The poly-L-lactic acid component and the poly-D-lactic acid component may be mixed by any method, and examples of the method include a method in which the poly-L-lactic acid component and the poly-D-lactic acid component are melt kneaded at a temperature not lower than the melting end temperature of the component having a higher melting point, a method in which the components are mixed in a solvent and then the solvent is removed, and a method in which at least one of the poly-L-lactic acid component and the poly-D-lactic acid component in the molten state is retained in advance under shear in a melter at a temperature range of the melting point −50° C. to the melting point +20° C., and then the poly-L-lactic acid component and the poly-D-lactic acid component are mixed such that crystals of the mixture remain.

The melting point refers to a temperature at the top of the crystal melting peak of poly(lactic acid) alone as measured with a differential scanning calorimeter by increasing the temperature from 30° C. to 250° C. at a temperature increasing rate of 20° C./min, and the melting end temperature refers to a temperature at the end of the crystal melting peak of poly(lactic acid) alone as measured with a differential scanning calorimeter.

Examples of the method of melt kneading at a temperature not lower than the melting end temperature include mixing the poly-L-lactic acid component and the poly-D-lactic acid component by the batch method and mixing them by the continuous method, and either method may be used. Examples of kneading apparatuses include single screw extruders, twin screw extruders, plastomill, kneaders, and stirred tank reactors equipped with a pressure reducing device, and to achieve uniform and sufficient kneading, it is preferable to use a single screw extruder or a twin screw extruder.

For the temperature conditions for melt kneading at a temperature not lower than the melting end temperature, the poly-L-lactic acid component and the poly-D-lactic acid component are preferably melt mixed at a temperature not lower than the melting end temperature of the component having a higher melting point. The temperature is preferably in the range of 140° C. to 250° C., more preferably 160° C. to 230° C., and particularly preferably 180° C. to 210° C. When the mixing temperature is in this preferred range, the mixing can be carried out in the molten state, and the molecular weight of the mixture is unlikely to decrease during the mixing. Furthermore, the flowability of the mixture can be kept constant, and a significant decrease in flowability is unlikely to occur.

For the time conditions for mixing, the mixing time is preferably in the range of 0.1 minute to 10 minutes, more preferably 0.3 minute to 5 minutes, and particularly preferably in the range of 0.5 minute to 3 minutes. When the mixing time is in this preferred range, the poly-L-lactic acid component and the poly-D-lactic acid component can be uniformly mixed, and, in addition, thermal decomposition due to mixing is unlikely to occur.

The pressure conditions for mixing at a temperature not lower than the melting end temperature are not limited, and the mixing may be carried out either in the air or in an atmosphere of an inert gas such as nitrogen.

Specific examples of the method of mixing the poly-L-lactic acid component and the poly-D-lactic acid component crystallized by applying shear or pressure in a melter include mixing by the batch method and mixing by the continuous method, and either method may be used. The degree of stereocomplexation (Sc) of the mixture of the poly-L-lactic acid component and the poly-D-lactic acid component after mixing can be controlled by a method in which the poly-L-lactic acid component and the poly-D-lactic acid component in the molten state are retained under shear in a melter at a temperature between the melting point −50° C. and the melting point +20° C., the melting point being that of the poly(lactic acid) having a lower melting point selected from the poly-L-lactic acid component and the poly-D-lactic acid component, or a method in which the poly-L-lactic acid component and the poly-D-lactic acid component in the molten state are retained under pressure in a melter at a temperature between the melting point −50° C. and the melting point +20° C., the melting point being that of the poly(lactic acid) component having a lower melting point selected from the poly-L-lactic acid component and the poly-D-lactic acid component. The degree of stereocomplexation (Sc) is calculated by Expression (5) above.

For the temperature conditions for mixing, the temperature is preferably in the range of the melting point −50° C. to the melting point +20° C., the melting point being that of the mixture of the poly-L-lactic acid component and the poly-D-lactic acid component. The mixing temperature is more preferably in the range of the melting point −40° C. to the melting point, particularly preferably in the temperature range of the melting point −30° C. to the melting point −5° C. Preferably, the temperature of the melter is typically set at the melting point +at least 20° C. so that the resin melts to exhibit favorable flowability. At such a preferred mixing temperature, the flowability does not decrease too much, and, in addition, crystals produced are unlikely to remelt. The melting point refers to a temperature at the top of the crystal melting peak as determined with a differential scanning calorimeter by increasing the temperature from 30° C. to 250° C. at a temperature increasing rate of 20° C./min.

The shear rate in mixing the poly-L-lactic acid component and the poly-D-lactic acid component crystallized by applying shear or pressure in a melter is preferably in the range of 10 to 400 (/sec). When the shear rate is in this preferred range, the poly-L-lactic acid component and the poly-D-lactic acid component can be uniformly mixed while the flowability and the crystallinity are maintained, and, in addition, thermal decomposition due to shear heating during mixing is unlikely to occur.

The pressure applied during mixing is preferably in the range of 0.05 to 10 (MPa). When the pressure is in this preferred range, the poly-L-lactic acid component and the poly-D-lactic acid component can be uniformly mixed while the flowability and the crystallinity are maintained.

In the kneading using an extruder, the poly(lactic acid) may be fed by any method, such as a method in which the poly-L-lactic acid component and the poly-D-lactic acid component are fed at one time via a resin hopper or a method in which using a side resin hopper as required, the poly-L-lactic acid component and the poly-D-lactic acid component are separately fed via a resin hopper and the side resin hopper. The poly(lactic acid) may also be fed to the kneading machine in the molten state directly from the poly(lactic acid) production step.

The screw element in the extruder preferably includes a kneading element at a mixing section so that the poly-L-lactic acid component and the poly-D-lactic acid component can be uniformly mixed to form a stereocomplex.

In the mixing step, the mixing weight ratio of the poly-L-lactic acid component composed of L-lactic acid units to the poly-D-lactic acid component composed of D-lactic acid units is preferably 90:10 to 10:90, more preferably 80:20 to 20:80, and particularly preferably 75:25 to 25:75. When the ratio of the total weight of the segment composed of L-lactic acid units and the total weight of the segment composed of D-lactic acid units is in this preferred range, a poly(lactic acid) stereocomplex tends to be formed, resulting in a sufficiently large increase in the melting point of the polylactic acid block copolymer. When the mixing weight ratio of the poly-L-lactic acid component to the poly-D-lactic acid component is other than 50:50, the component (the poly-L-lactic acid component or the poly-D-lactic acid component) having a larger weight average molecular weight is preferably blended in a larger amount.

In this mixing step, the mixture preferably contains a catalyst to allow the subsequent solid state polymerization to efficiently proceed. The catalyst may be a residue of a catalyst used to produce the poly-L-lactic acid component and/or the poly-D-lactic acid component, and one or more catalysts selected from the catalysts listed above may be further added in the mixing step.

The amount of the catalyst for allowing the solid state polymerization to efficiently proceed is not limited but preferably 0.001 part by weight to 1 part by weight based on 100 parts by weight of the mixture of the poly-L-lactic acid component and the poly-D-lactic acid component, particularly preferably 0.001 part by weight to 0.5 part by weight. When the amount of the catalyst is in this preferred range, the reaction time of the solid state polymerization is effectively reduced, and, in addition, the final resulting polylactic acid block copolymer tends to have a large molecular weight.

The weight average molecular weight (Mw) of the mixture of the poly-L-lactic acid component and the poly-D-lactic acid component after mixing is preferably 90,000 or more but less than 300,000 in terms of mechanical properties of the mixture. The Mw is more preferably 120,000 or more but less than 300,000, particularly preferably 140,000 or more but less than 300,000.

The polydispersity of the mixture of the poly-L-lactic acid component and the poly-D-lactic acid component after mixing is preferably in the range of 1.5 to 4.0, more preferably in the range of 2.0 to 3.7, and particularly preferably in the range of 2.5 to 3.5. The polydispersity refers to the ratio of the weight average molecular weight to the number average molecular weight of the mixture, and, specifically, is a value determined by gel permeation chromatography (GPC) against poly(methyl methacrylate) standards using hexafluoroisopropanol or chloroform as a solvent.

The lactide amount and the oligomer amount in the poly-L-lactic acid component or the poly-D-lactic acid component are preferably each 5% or less, more preferably 3% or less, and particularly preferably 1% or less. The lactic acid amount in the poly-L-lactic acid component or the poly-D-lactic acid component is preferably 2% or less, more preferably 1% or less, and particularly preferably 0.5% or less.

When the mixture is subjected to solid state polymerization, the mixture of the poly-L-lactic acid component and the poly-D-lactic acid component may be in any form such as a block, a film, a pellet, and powder, and to allow the solid state polymerization to proceed efficiently, it is preferable to use a pellet or powder. Examples of the method of forming the mixture of the poly-L-lactic acid component and the poly-D-lactic acid component into pellets include a method in which a mixture is extruded into a strand and pelletized and a method in which a mixture is extruded into water and pelletized using an underwater pelletizer. Examples of the method of forming the mixture of the poly-L-lactic acid and the poly-D-lactic acid into powder include pulverization using a pulverizer such as a mixer, a blender, a ball mill, or a hammer mill. This solid state polymerization step may be carried out by any method such as the batch method or the continuous method. For a reaction vessel, reactors such as a stirred tank reactor, a mixer-type reactor, and a column reactor can be used, and these reactors can be used in combination of two or more.

When the solid state polymerization step is carried out, the mixture of the poly-L-lactic acid component and the poly-D-lactic acid component is preferably crystallized. In the present invention, in the case where the mixture obtained in the step of mixing the poly-L-lactic acid component and the poly-D-lactic acid component is in a crystallized state, crystallization of the mixture of the poly-L-lactic acid component and the poly-D-lactic acid component is not necessarily required when the solid state polymerization step is carried out, but the crystallization can further improve the efficiency in the solid state polymerization.

The method of crystallization is not limited, and any known method can be used. Examples of the method include holding the mixture in the gas phase or in the liquid phase at a crystallization treatment temperature and cooling and solidifying the molten mixture of the poly-L-lactic acid component and the poly-D-lactic acid component while drawing or shearing it, and in view of ease of operation, holding in the gas phase or in the liquid phase at a crystallization treatment temperature is preferred.

The crystallization treatment temperature is not limited as long as it is in the temperature range higher than the glass transition temperature and lower than the melting point of the poly(lactic acid) having a lower melting point selected from the poly-L-lactic acid component and the poly-D-lactic acid component mixed. More preferably, the crystallization treatment temperature is in the range between the heating crystallization temperature and the cooling crystallization temperature as measured with a differential scanning calorimeter in advance.

The crystallization may be carried out under reduced pressure, normal pressure, or increased pressure.

The time for carrying out the crystallization is not limited, and the crystallization is sufficiently achieved in 3 hours or in 2 hours.

For the temperature for carrying out the solid state polymerization step, temperatures not higher than the melting point of the mixture of the poly-L-lactic acid component and the poly-D-lactic acid component are preferred. Since the mixture of the poly-L-lactic acid component and the poly-D-lactic acid component, as a result of stereocomplex formation, has a melting point derived from stereocomplex crystals in the range of 190° C. to 230° C., and has a melting point derived from crystals of poly-L-lactic acid alone and crystals of poly-D-lactic acid alone in the range of 150° C. to 185° C., the solid state polymerization is preferably carried out at a temperature not higher than these melting points. Specifically, the solid state polymerization temperature is preferably 100° C. to 220° C., and to allow the solid state polymerization to proceed efficiently, the temperature is more preferably 110° C. to 200° C., still more preferably 120° C. to 180° C., and particularly preferably 130° C. to 170° C.

To shorten the reaction time of the solid state polymerization, it is preferable to increase the temperature stepwise or continuously as the reaction proceeds. The temperature conditions in increasing the temperature stepwise during the solid state polymerization is preferably such that the temperature is increased as follows: 120° C. to 145° C. for 1 hour to 15 hours in a first stage, 135° C. to 160° C. for 1 hour to 15 hours in a second stage, and 150° C. to 175° C. for 10 to 30 hours in a third stage; more preferably such that the temperature is increased as follows: 130° C. to 145° C. for 2 to 12 hours in the first stage, 140° C. to 160° C. for 2 hours to 12 hours in the second stage, and 155° C. to 175° C. for 10 hours to 25 hours in the third stage. The temperature conditions in increasing the temperature continuously during the solid state polymerization are preferably such that the temperature is increased continuously from an initial temperature of 130° C. to 150° C. at a rate of 1 to 5 (° C./min) to 150° C. to 175° C. Combining the stepwise temperature increase with the continuous temperature increase is also preferred to allow the solid state polymerization to proceed efficiently.

The solid state polymerization step is preferably carried out under vacuum or under a stream of inert gas such as dry nitrogen. The degree of vacuum in the solid state polymerization under vacuum is preferably 150 Pa or lower, more preferably 75 Pa or lower, and particularly preferably 20 Pa or lower. The flow rate in the solid state polymerization under a stream of inert gas is preferably in the range of 0.1 to 2,000 (mL/min) per 1 g of the mixture, more preferably in the range of 0.5 to 1,000 (mL/min), and particularly preferably in the range of 1.0 to 500 (mL/min).

The polymer yield (Y) after the solid state polymerization is preferably 90% or more. The polymer yield (Y) after the solid state polymerization is more preferably 93% or more, particularly preferably 95% or more. The polymer yield (Y) as used herein is the percentage of the weight of the polylactic acid block copolymer after the solid state polymerization with respect to the weight of the mixture before the solid state polymerization. Specifically, the polymer yield (Y) can be calculated by Expression (8) below, where Wp is the weight of the mixture before the solid state polymerization, and Ws is the weight of the polymer after the solid state polymerization.

$$Y=Ws/Wp\times100 \qquad (8)$$

In the solid state polymerization step, the polydispersity of the mixture preferably decreases. Specifically, the polydispersity of the mixture before the solid state polymerization in the range of 1.5 to 4.0 preferably decreases to the polydispersity of the polylactic acid block copolymer after the solid state polymerization in the range of 1.5 to 2.7. More preferably, the polydispersity of the mixture before the solid state polymerization in the range of 2.0 to 3.7 decreases to the polydispersity of the polylactic acid block copolymer after the solid state polymerization in the range of 1.8 to 2.6, and particularly preferably, the polydispersity of the mixture before the solid state polymerization in the range of 2.5 to 3.5 decreases to the polydispersity of the polylactic acid block copolymer after the solid state polymerization in the range of 2.0 to 2.5.

(Production Method 3)

Next, the method in which a poly-L-lactic acid component and a poly-D-lactic acid component are melt kneaded for a long time at a temperature not lower than the melting end temperature of the component having a higher melting point, whereby a segment of L-lactic acid units and a segment of D-lactic acid units are transesterified to give a polylactic acid block copolymer will be described. Also in this production method, the poly-L-lactic acid component and the poly-D-lactic acid component can be produced by either the ring-opening polymerization method or the direct polymerization method described above.

When a polylactic acid block copolymer is produced by this method, to increase the degree of stereocomplexation after melt kneading, one of the poly-L-lactic acid component and the poly-D-lactic acid component preferably has a weight average molecular weight of 60,000 to 300,000, and the other preferably has a weight average molecular weight of 10,000 to 50,000. More preferably, the weight average molecular weight of one is 100,000 to 270,000, and the weight average molecular weight of the other is 15,000 to 45,000. Particularly preferably, the weight average molecular weight of one is 150,000 to 240,000, and the weight average molecular weight of the other is 20,000 to 40,000. The combination of the weight average molecular weights of the poly-L-lactic acid component and the poly-D-lactic acid component is preferably selected as appropriate such that the weight average molecular weight after mixing is 90,000 or more.

Furthermore, to increase the mechanical properties of the poly(lactic acid) resin composition after melt kneading, one of the poly-L-lactic acid component and the poly-D-lactic acid component preferably has a weight average molecular weight of 60,000 to 300,000, and the other preferably has a weight average molecular weight of 10,000 to 100,000.

Examples of the method of melt kneading for a long time at a temperature not lower than the melting end temperature include mixing the poly-L-lactic acid component and the poly-D-lactic acid component by the batch method and mixing them by the continuous method, and either method may be used. Examples of kneading apparatuses include single screw extruders, twin screw extruders, plastomill, kneaders, and stirred tank reactors equipped with a pressure reducing device, and to achieve uniform and sufficient kneading, it is preferable to use a single screw extruder or a twin screw extruder.

For the temperature conditions for mixing, it is important that the poly-L-lactic acid component and the poly-D-lactic acid component be mixed at a temperature not lower than the melting end temperature of the component having a higher melting point. The temperature is preferably in the range of 140° C. to 250° C., more preferably 160° C. to 230° C., and particularly preferably 180° C. to 210° C. When the mixing temperature is in this preferred range, the flowability does not decrease too much, and, in addition, the molecular weight of the mixture is unlikely to decrease.

For the time conditions for mixing, the mixing time is preferably in the range of 0.1 minute to 30 minutes, more preferably 0.3 minute to 20 minutes, and particularly preferably in the range of 0.5 minute to 10 minutes. When the mixing time is in this preferred range, the poly-L-lactic acid component and the poly-D-lactic acid component are uniformly mixed, and, in addition, thermal decomposition due to mixing is unlikely to occur.

The pressure conditions for mixing are not limited, and the mixing may be carried out either in the air or in an atmosphere of an inert gas such as nitrogen.

The mixing weight ratio of the poly-L-lactic acid component composed of L-lactic acid units to the poly-D-lactic acid component composed of D-lactic acid units to be mixed is preferably 80:20 to 20:80, more preferably 75:25 to 25:75, still more preferably 70:30 to 30:70, and particularly preferably 60:40 to 40:60. When the weight ratio of the poly-L-lactic acid component composed of L-lactic acid units is in this preferred range, a poly(lactic acid) stereocomplex tends to be formed, as a result of which the final resulting polylactic acid block copolymer has a sufficiently high melting point.

In this mixing step, the mixture preferably contains a catalyst to allow the ester exchange of the segment of L-lactic acid units and the segment of D-lactic acid units to efficiently proceed. The catalyst may be a residue of a catalyst used to produce the poly-L-lactic acid component and/or the poly-D-lactic acid component, and any other catalyst may be further added in the mixing step.

The amount of the catalyst is not limited but preferably 0.001 part by weight to 1 part by weight based on 100 parts by weight of the mixture of the poly-L-lactic acid component and the poly-D-lactic acid component, particularly preferably 0.001 part by weight to 0.5 part by weight. When the amount of the catalyst is in this preferred range, ester exchange of the mixture occurs at a sufficiently high frequency, and, in addition, the final resulting polylactic acid block copolymer tends to have a large molecular weight.

(Production Method 4)

Next, the method in which a polyfunctional compound(s) is/are mixed with a poly-L-lactic acid component and a poly-D-lactic acid component, whereby the poly-L-lactic acid component and the poly-D-lactic acid component are covalently bonded through the polyfunctional compound(s) to give a polylactic acid block copolymer will be described. The poly-L-lactic acid component and the poly-D-lactic acid component used in this production method can be produced by either the ring-opening polymerization method or the direct polymerization method described above.

For the weight average molecular weights of the poly-L-lactic acid component and the poly-D-lactic acid component used to produce a polylactic acid block copolymer by this method, to increase the degree of stereocomplexation, the weight average molecular weight of one of the poly-L-lactic acid component and the poly-D-lactic acid component is preferably 30,000 to 100,000, and the weight average molecular weight of the other is preferably 10,000 to 30,000. More preferably, the weight average molecular weight of one is 35,000 to 90,000, and the weight average molecular weight of the other is 10,000 to 25,000. Particularly preferably, the weight average molecular weight of one is 40,000 to 80,000, and the weight average molecular weight of the other is 10,000 to 20,000.

Furthermore, to increase the mechanical properties of the poly(lactic acid) resin composition after melt kneading, one of the poly-L-lactic acid component and the poly-D-lactic acid component preferably has a weight average molecular weight of 60,000 to 300,000, and the other preferably has a weight average molecular weight of 10,000 to 100,000.

To increase the degree of stereocomplexation, the weight average molecular weight ratio of the poly-L-lactic acid component to the poly-D-lactic acid component used in the above mixing is preferably 2 or greater but less than 10, more preferably 3 or greater but less than 10, and particularly preferably 4 or greater but less than 10.

The poly-L-lactic acid component and the poly-D-lactic acid component for use in the present invention preferably satisfies both the requirements that the weight average molecular weights of the poly-L-lactic acid component and the poly-D-lactic acid component be each in the above ranges and that the weight average molecular weight ratio of the poly-L-lactic acid component to the poly-D-lactic acid component be 2 or greater but less than 30.

The polyfunctional compound(s) used herein is/are not limited, and examples thereof include polycarboxylic acid anhydrides, polycarboxylic acid halides, polycarboxylic acid, polycarbodiimides, polyisocyanates, polyamines, polyalcohols, and polyepoxy compounds. Specific examples include polycarboxylic acid anhydrides such as 1,2-cyclohexanedicarboxylic anhydride, succinic acid anhydride, phthalic acid anhydride, trimellitic acid anhydride, 1,8-naphthalenedicarboxylic acid anhydride, and pyromellitic acid anhydride; polycarboxylic acid halides such as isophthalic acid chloride, terephthalic acid chloride, and 2,6-naphthalenedicarboxylic acid chloride; polycarboxylic acid such as succinic acid, adipic acid, sebacic acid, fumaric acid, terephthalic acid, isophthalic acid, and 2,6-naphthalenedicarboxylic acid; polycarbodiimides such as poly(1,6-cyclohexane carbodiimide), poly(4,4'-methylenebis cyclohexyl carbodiimide), poly(1,3-cyclohexylene carbodiimide), poly(1,4-cyclohexylene carbodiimide), poly (4,4'-diphenylmethane carbodiimide), poly(3,3'-dimethyl-4, 4'-diphenylmethane carbodiimide), poly(naphthylene carbodiimide), poly(p-phenylene carbodiimide), poly(m-phenylene carbodiimide), polyp-tolyl carbodiimide), poly (diisopropyl carbodiimide), poly(methyl diisopropyl phenylene carbodiimide), poly(triethylphenylene carbodiimide), and cyclic carbodiimides bonded with aliphatic groups, alicyclic groups, or aromatic groups; polyisocyanates such as hexamethylene diisocyanate, 4,4'-diphenylmethane diisocyanate, and toluene-2,4-diisocyanate; polyamines such as ethylenediamine, hexanediamine, and diethylenetriamine; polyalcohols such as ethylene glycol, propylene glycol, butanediol, hexanediol, glycerin, trimethylolpropane, and pentaerythritol; and polyepoxy compounds such as diglycidyl terephthalate, naphthalenedicarboxylic acid diglycidyl ester, trimellitic acid triglycidyl ester, pyromellitic acid tetraglycidyl ester, ethylene glycol diglycidyl ether, propylene glycol diglycidyl ether, cyclohexane dimethanol diglycidyl ether, glycerol triglycidyl ether, trimethylol propane triglycidyl ether, and pentaerythritol polyglycidyl ether. Among them, polycarboxylic acid anhydrides, polyisocyanates, polyalcohols, and polyepoxy compounds are preferable, and polycarboxylic acid anhydrides, polyisocyanates, and polyepoxy compounds are more preferable. One of these or a combination of two or more of these may be used.

The amount of the polyfunctional compound(s) mixed is not limited but preferably 0.01 part by weight to 20 parts by weight based on 100 parts by weight of the total amount of the poly-L-lactic acid component and the poly-D-lactic acid component, more preferably 0.1 part by weight to 10 parts by weight. When the amount of the polyfunctional compound(s) added is in this preferred range, the effect of forming a covalent bond can be fully exerted.

Furthermore, when a polyfunctional compound(s) is/are used, a reaction catalyst(s) may be added for promoting the reaction of the poly-L-lactic acid component and the poly-D-lactic acid component with the polyfunctional compound(s). Examples of the reaction catalyst(s) include alkali metal compounds such as sodium hydroxide, potassium hydroxide, lithium hydroxide, cesium hydroxide, sodium hydrogen carbonate, potassium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogenphosphate, dipotassium hydrogenphosphate, dilithium hydrogenphosphate, disodium salt of bisphenol A, dipotassium salt of bisphenol A, dilithium salt of bisphenol A, sodium salt of phenol, potassium salt of phenol, lithium salt of phenol, and cesium salt of phenol; alkaline earth metal compounds such as calcium hydroxide, barium hydroxide, magnesium hydroxide, strontium hydroxide, calcium hydrogen carbonate, barium carbonate, magnesium carbonate, strontium carbonate, calcium acetate, barium acetate, magnesium acetate, strontium acetate, calcium stearate, magnesium stearate, and strontium stearate; tertiary amines such as triethylamine, tributylamine, trihexylamine, triamylamine, triethanolamine, dimethyl aminoethanol, triethylenediamine, dimethylphenylamine, dimethylbenzylamine, 2-(dimethylaminomethyl)phenol, dimethylaniline, pyridine, picoline, and 1,8-diazabicyclo(5,4,0) undecene-7; imidazole compounds such as 2-methylimidazole, 2-ethylimidazole, 2-isopropylimidazole, 2-ethyl-4-methylimidazole, and 4-phenyl-2-methylimidazole; quaternary ammonium salts such as tetramethylammonium chloride, tetraethylammonium chloride, tetrabutylammonium bromide, trimethylbenzylammonium chloride, triethylbenzylammonium chloride, tripropylbenzylammonium chloride, and N-methylpyridinium chloride; phosphine compounds such as trimethylphosphine, triethylphosphine, tributylphosphine, and trioctylphosphine; phosphonium salts such as tetramethylphosphonium bromide, tetrabutylphosphonium bromide, tetraphenylphosphonium bromide, ethyltriphenylphosphonium bromide, and triphenylbenzylphosphonium bromide; phosphoric acid esters such as trimethyl phosphate, triethyl phosphate, tributyl phosphate, trioctyl phosphate, tributoxyethyl phosphate, triphenyl phosphate, tricresyl phosphate, trixylenyl phosphate, cresyl diphenyl phosphate, octyl diphenyl phosphate, tri(p-hydroxy)phenyl phosphate, and tri(p-methoxy)phenyl phosphate; organic acids such as oxalic acid, p-toluenesulfonic acid, dinonylnaphthalene disulfonic acid, and dodecylbenzenesulfonic acid; and Lewis acids such as boron trifluoride, aluminum tetrachloride, titanium tetrachloride, and tin tetrachloride. One of these or a combination of two or more of these may be used.

The amount of the catalyst(s) added is not limited but preferably 0.001 part by weight to 1 part by weight based on 100 parts by weight of the total amount of the poly-L-lactic acid component and the poly-D-lactic acid component. When the amount of the catalyst(s) is in this preferred range, the reaction is sufficiently promoted, and, in addition, the final resulting polylactic acid block copolymer tends to have a large molecular weight.

The poly-L-lactic acid component and the poly-D-lactic acid component may be reacted with the polyfunctional compound(s) by any method, and examples of the method include a method in which melt kneading is performed at a temperature not lower than the melting end temperature of the component having a higher melting point selected from the poly-L-lactic acid component and the poly-D-lactic acid component.

Examples of the method of melt kneading at a temperature not lower than the melting end temperature include mixing the poly-L-lactic acid component and the poly-D-lactic acid component by the batch method and mixing them by the continuous method, and either method may be used. Examples of kneading apparatuses include single screw extruders, twin screw extruders, plastomill, kneaders, and stirred tank reactors equipped with a pressure reducing device, and to achieve uniform and sufficient kneading, it is preferable to use a single screw extruder or a twin screw extruder.

For the temperature conditions for melt kneading, the poly-L-lactic acid component and the poly-D-lactic acid component are preferably melt mixed at a temperature not lower than the melting end temperature of the component having a higher melting point. The temperature is preferably in the range of 140° C. to 250° C., more preferably 160° C. to 230° C., and particularly preferably 180° C. to 210° C. When the mixing temperature is in this preferred range, the flowability does not decrease too much, and, in addition, the molecular weight of the mixture is unlikely to decrease.

For the time conditions for melt kneading, the kneading time is preferably in the range of 0.1 minute to 30 minutes, more preferably 0.3 minute to 20 minutes, and particularly preferably in the range of 0.5 minute to 10 minutes. When the mixing time is in this preferred range, the poly-L-lactic acid component and the poly-D-lactic acid component are uniformly mixed, and, in addition, thermal decomposition due to mixing is unlikely to occur.

The pressure conditions for melt kneading are not limited, and the mixing may be carried out either in the air or in an atmosphere of an inert gas such as nitrogen.

The mixing weight ratio of the poly-L-lactic acid component to the poly-D-lactic acid component to be mixed is preferably 90:10 to 10:90, more preferably 80:20 to 20:80, and particularly preferably 75:25 to 60:40 or 40:60 to 25:75. When the weight ratio of the poly-L-lactic acid component composed of L-lactic acid units is in this preferred range, a poly(lactic acid) stereocomplex tends to be formed, resulting in a sufficiently large increase in the melting point of the final resulting polylactic acid block copolymer.

Although the polylactic acid block copolymer obtained by mixing the polyfunctional compound(s) with the poly-L-lactic acid component and the poly-D-lactic acid component is a high-molecular-weight product because the poly-L-lactic acid component and the poly-D-lactic acid component are covalently bonded through the polyfunctional compound(s), the polylactic acid block copolymer may also be subjected to solid state polymerization after the mixing using the above-described method.

<Method of Producing Poly(Lactic Acid) Stereocomplex by Mixing Poly-L-Lactic Acid Component and Poly-D-Lactic Acid Component>

The weight average molecular weights of the poly-L-lactic acid component and the poly-D-lactic acid component used to produce a poly(lactic acid) stereocomplex by this method are not limited. Preferably, the weight average molecular weight of one of the poly-L-lactic acid or the poly-D-lactic acid is 50,000 to 300,000, and the weight average molecular weight of the other is 10,000 to 200,000. More preferably, the weight average molecular weight of one is 70,000 to 250,000, and the weight average molecular weight of the other is 20,000 to 150,000. Particularly preferably, the weight average molecular weight of one is 100,000 to 230,000, and the weight average molecular weight of the other is 30,000 to 120,000.

For the poly-L-lactic acid component and the poly-D-lactic acid component for use in the present invention, the ratio of the higher weight average molecular weight to the lower weight average molecular weight is not limited but preferably 1.1 or greater but less than 30, more preferably 1.5 or greater but less than 20, and most preferably 2 or greater but less than 10. The combination of the weight average molecular weights of the poly-L-lactic acid and the poly-D-lactic acid is preferably selected as appropriate such that the weight average molecular weight after mixing is 80,000 or more.

The poly(lactic acid) resin for use in the present invention preferably satisfies both the requirements that the weight average molecular weights of the poly-L-lactic acid component and the poly-D-lactic acid component be each in the above ranges and that the weight average molecular weight ratio of the poly-L-lactic acid component to the poly-D-lactic acid component be in the above range.

The weight average molecular weight is a value determined by gel permeation chromatography (GPC) against poly(methyl methacrylate) standards using hexafluoroisopropanol or chloroform as a solvent.

The poly-L-lactic acid component and the poly-D-lactic acid component may be mixed by any method, and examples of the method include a method in which the poly-L-lactic acid component and the poly-D-lactic acid component are melt kneaded at a temperature not lower than the melting end temperature of the component having a higher melting point, a method in which the components are mixed in a solvent and then the solvent is removed, and a method in which at least one of the poly-L-lactic acid component and the poly-D-lactic acid component in the molten state is retained in advance under shear in a melter at a temperature range of the melting point −50° C. to the melting point +20° C., and then the poly-L-lactic acid component and the poly-D-lactic acid component are mixed such that crystals of the mixture remain.

The melting point refers to a temperature at the top of the crystal melting peak of poly(lactic acid) alone as measured with a differential scanning calorimeter by increasing the temperature from 30° C. to 250° C. at a temperature increasing rate of 20° C./min, and the melting end temperature refers to a temperature at the end of the crystal melting peak of poly(lactic acid) alone as measured with a differential scanning calorimeter.

Examples of the method of melt kneading at a temperature not lower than the melting end temperature include mixing the poly-L-lactic acid component and the poly-D-lactic acid component by the batch method and mixing them by the continuous method, and either method may be used. Examples of kneading apparatuses include single screw extruders, twin screw extruders, plastomill, kneaders, and stirred tank reactors equipped with a pressure reducing device, and to achieve uniform and sufficient kneading, it is preferable to use a single screw extruder or a twin screw extruder.

For the temperature conditions for melt kneading at a temperature not lower than the melting end temperature, the poly-L-lactic acid component and the poly-D-lactic acid component are preferably melt mixed at a temperature not lower than the melting end temperature of the component having a higher melting point. The temperature is preferably in the range of 140° C. to 250° C., more preferably 160° C. to 230° C., and particularly preferably 180° C. to 210° C. When the mixing temperature is in this preferred range, the mixing can be carried out in the molten state, and the molecular weight of the mixture is unlikely to decrease during the mixing. Furthermore, the flowability of the mixture can be kept constant, and a significant decrease in flowability is unlikely to occur.

For the time conditions for mixing, the mixing time is preferably in the range of 0.1 minute to 10 minutes, more preferably 0.3 minute to 5 minutes, and particularly preferably in the range of 0.5 minute to 3 minutes. When the mixing time is in this preferred range, the poly-L-lactic acid component and the poly-D-lactic acid component can be uniformly mixed, and, in addition, thermal decomposition due to mixing is unlikely to occur.

The pressure conditions for mixing at a temperature not lower than the melting end temperature are not limited, and the mixing may be carried out either in the air or in an atmosphere of an inert gas such as nitrogen.

Specific examples of the method of mixing the poly-L-lactic acid component and the poly-D-lactic acid component crystallized by applying shear or pressure in a melter include mixing by the batch method and mixing by the continuous method, and either method may be used. The degree of stereocomplexation of the mixture of the poly-L-lactic acid component and the poly-D-lactic acid component after mixing can be controlled by a method in which the poly-L-lactic acid component and the poly-D-lactic acid component in the molten state are retained under shear in a melter at a temperature between the melting point −50° C. and the melting point +20° C., the melting point being that of the poly(lactic acid) having a lower melting point selected from the poly-L-lactic acid component and the poly-D-lactic acid component, or a method in which the poly-L-lactic acid component and the poly-D-lactic acid component in the molten state are retained under pressure in a melter at a temperature between the melting point −50° C. and the melting point +20° C., the melting point being that of the poly(lactic acid) having a lower melting point selected from the poly-L-lactic acid and the poly-D-lactic acid.

The degree of stereocomplexation (Sc) is preferably 80% or more, more preferably 85% or more, and particularly preferably 90% or more. In other words, the degree of stereocomplexation (Sc) determined by Expression (5) above satisfies Expression (3) above.

$$Sc=\Delta Hh/(\Delta Hl+\Delta Hh)\times 100>80 \tag{3}$$

For the temperature conditions for mixing, the temperature is preferably in the range of the melting point −50° C. to the melting point +20° C., the melting point being that of the mixture of the poly-L-lactic acid component and the poly-D-lactic acid component. The mixing temperature is more preferably in the range of the melting point −40° C. to the melting point, particularly preferably in the temperature range of the melting point −30° C. to the melting point −5° C. Preferably, the temperature of the melter is typically set at the melting point +at least 20° C. so that the resin melts to exhibit favorable flowability. At such a preferred mixing temperature, the flowability does not decrease too much, and, in addition, crystals produced are unlikely to remelt. The melting point refers to a temperature at the top of the crystal melting peak as determined with a differential scanning calorimeter by increasing the temperature from 30° C. to 250° C. at a temperature increasing rate of 20° C./min.

The shear rate in mixing the poly-L-lactic acid component and the poly-D-lactic acid component crystallized by applying shear or pressure in a melter is preferably in the range of 10 to 400 (/sec). When the shear rate is in this preferred range, the poly-L-lactic acid component and the poly-D-lactic acid component can be uniformly mixed while the flowability and the crystallinity are maintained, and, in addition, thermal decomposition due to shear heating during mixing is unlikely to occur.

The pressure during mixing is preferably in the range of 0.05 to 10 (MPa). When the pressure is in this preferred range, the poly-L-lactic acid and the poly-D-lactic acid can be uniformly mixed while the flowability and the crystallinity are maintained.

In the kneading using an extruder, the poly(lactic acid) may be fed by any method, such as a method in which the poly-L-lactic acid component and the poly-D-lactic acid component are fed at one time via a resin hopper or a method in which using a side resin hopper as required, the poly-L-lactic acid component and the poly-D-lactic acid component are separately fed via a resin hopper and the side resin hopper. The poly(lactic acid) may also be fed to the kneading machine in the molten state directly from the poly(lactic acid) production step.

The screw element in the extruder preferably includes a kneading element at a mixing section so that the poly-L-lactic acid component and the poly-D-lactic acid component can be uniformly mixed to form a stereocomplex.

In the mixing step, the mixing weight ratio of the poly-L-lactic acid component composed of L-lactic acid units to the poly-D-lactic acid component composed of D-lactic acid units is preferably 90:10 to 10:90, more preferably 80:20 to 20:80, and particularly preferably 75:25 to 60:40 or 40:60 to 25:75. When the ratio of the total weight of the segment composed of L-lactic acid units and the total weight of the segment composed of D-lactic acid units is in this preferred range, a poly(lactic acid) stereocomplex tends to be formed, resulting in a stereocomplex with high heat resistance. When the mixing weight ratio of the poly-L-lactic acid component to the poly-D-lactic acid component is other than 50:50, the component (the poly-L-lactic acid component or the poly-D-lactic acid component) having a larger weight average molecular weight is preferably blended in a larger amount.

The polydispersity of the mixture of the poly-L-lactic acid component and the poly-D-lactic acid component after mixing is preferably in the range of 1.5 to 4.0, more preferably in the range of 2.0 to 3.7, and particularly preferably in the range of 2.5 to 3.5. The polydispersity refers to the ratio of the weight average molecular weight to the number average molecular weight of the mixture, and, specifically, is a value determined by gel permeation chromatography (GPC) against poly(methyl methacrylate) standards using hexafluoroisopropanol or chloroform as a solvent.

For the stereocomplex formed by mixing the poly-L-lactic acid component and the poly-D-lactic acid component, a polylactic acid block copolymer composed of a poly-L-lactic acid segment composed mainly of L-lactic acid and a poly-D-lactic acid segment composed mainly of D-lactic acid may be mixed for the purpose of forming the stereocomplex with a higher efficiency.

The method of producing the polylactic acid block copolymer added is not limited, and any conventional method of producing poly(lactic acid) can be used. Specific examples of the method include the methods of producing the polylactic acid block copolymer described above, Production Method 1 to 4: the lactide method in which either L-lactide or D-lactide, a cyclic dimer produced from a raw material lactic acid, is subjected to ring-opening polymerization in the presence of a catalyst, and a lactide, an optical isomer of the poly(lactic acid), is further added and the resulting mixture is subjected to ring-opening polymerization to give a polylactic acid block copolymer (Production Method 1); a method in which raw materials are each subjected to direct polymerization or ring-opening polymerization via lactide to provide a poly-L-lactic acid component and a poly-D-lactic acid component, and then the poly-L-lactic acid component and the poly-D-lactic acid component obtained are mixed and subjected to solid state polymerization to give a polylactic acid block copolymer (Production Method 2); a method in which a poly-L-lactic acid component and a poly-D-lactic acid component are melt kneaded for a long time at a temperature not lower than the melting end temperature of the component having a higher melting point, whereby a segment of L-lactic acid units and a segment of D-lactic acid units are transesterified to give a polylactic acid block copolymer (Production Method 3); and a method in which a polyfunctional compound(s) is/are mixed with a poly-L-lactic acid component and a poly-D-lactic acid component and allowed to react, whereby the poly-L-lactic acid component and the poly-D-lactic acid component are covalently bonded through the polyfunctional compound(s) to give a polylactic acid block copolymer (Production Method 4).

The method of mixing the stereocomplex composed of the mixture of the poly-L-lactic acid component and the poly-D-lactic acid component with the polylactic acid block copolymer is not limited, and examples of the method include a method in which the stereocomplex composed of the poly-L-lactic acid component and the poly-D-lactic acid component and the polylactic acid block copolymer are melt kneaded at a temperature not lower than the melting end temperature of the component having a higher melting point selected from the stereocomplex or the polylactic acid block copolymer, and a method in which the stereocomplex and the polylactic acid block copolymer are mixed in a solvent, and then the solvent is removed.

The poly-L-lactic acid component, the poly-D-lactic acid component, and the polylactic acid block copolymer may be mixed in any order. The polylactic acid block copolymer may be added to the poly-L-lactic acid component and the poly-D-lactic acid component mixed in advance, or the poly-L-lactic acid component and the poly-D-lactic acid component may be added to the polylactic acid block copolymer.

The amount of the polylactic acid block copolymer added to the stereocomplex formed by mixing the poly-L-lactic acid component and the poly-D-lactic acid component is preferably 1 part by weight to 100 parts by weight based on 100 parts by weight of the stereocomplex formed by mixing the poly-L-lactic acid component and the poly-D-lactic acid component, more preferably 5 parts by weight to 80 parts by weight. The polylactic acid block copolymer in an amount in this preferred range can promote stereocomplex formation.

The poly(lactic acid) resin of the present invention preferably includes a catalyst deactivator as long as the object of the present invention is not adversely affected. Examples of the catalyst deactivator include hindered phenolic compounds, thioether compounds, vitamin compounds, triazole compounds, polyamine compounds, compounds of hydrazine derivatives, and phosphorous compounds, and these may be used in combination. In particular, it is preferable to include at least one phosphorous compound, more preferably, at least one phosphate compound, phosphite compound, or metal phosphate inorganic compound.

Specific examples of the catalyst deactivator including a phosphorous compound include phosphite compounds such as "ADK STAB" AX-71 (dioctadecyl phosphate), PEP-8 (distearylpentaerythritol diphosphite), and PEP-36 (cyclic neopentatetraylbis(2,6-t-butyl-4-methylphenyl)phosphite)) available from ADEKA CORPORATION, and at least one metal phosphate inorganic compound selected from sodium dihydrogen phosphate, potassium dihydrogen phosphate, lithium dihydrogen phosphate, calcium dihydrogen phosphate, disodium hydrogen phosphate, dipotassium hydrogen phosphate, calcium hydrogen phosphate, sodium hydrogen phosphite, potassium hypophosphite, calcium hydrogen phosphite, sodium hypophosphite, potassium hypophosphite, and calcium hypophosphite. Among them, sodium dihydrogen phosphate and potassium dihydrogen phosphate are more preferred.

The amount of the metal phosphate inorganic compound added is preferably 0.005 part by weight to 1.2 parts by weight based on 100 parts by weight of the poly(lactic acid) resin, more preferably 0.015 part by weight to 0.8 part by weight, and particularly preferably 0.05 part by weight to 0.5 part by weight.

The metal phosphate inorganic compound may be added at any timing, but in terms of high heat resistance and excellent crystallization properties, it is preferably added together with a poly(lactic acid) resin after the poly(lactic acid) resin is produced once. Alternatively, the metal phosphate may be added during the process of producing a poly(lactic acid) resin including the poly-L-lactic acid component and the poly-D-lactic acid component, or may be added to the poly-L-lactic acid component or the poly-D-lactic acid component used as a component of the poly(lactic acid) resin.

The poly(lactic acid) resin of the present invention may include a polyfunctional compound(s) as long as the effects of the present invention are not adversely affected.

The polyfunctional compound(s) for use is/are not limited, and the polyfunctional compounds listed in the method of producing the polylactic acid block copolymer described in Production Method 4 can be used.

In the present invention, when the polyfunctional compound is a polyepoxy compound, the polyepoxy compound may be a polymer having more than one epoxy group in one molecule, and specific examples include acrylic resin-based reactive compounds such as polymers of a mixture of an epoxy group-containing acrylic monomer and a styrene monomer and polymers of a mixture of an epoxy group-containing acrylic monomer, a styrene monomer, and any other vinyl monomer.

Examples of the epoxy group-containing acrylic monomer include glycidyl (meth)acrylate and glycidyl (meth)acrylate ether, among which glycidyl acrylate or glycidyl methacrylate is preferably used in terms of radical polymerizability. These can be used alone or in combination of two or more.

Examples of the styrene monomer include styrene, α-methylstyrene, vinyltoluene, p-methylstyrene, t-butylstyrene, o-chlorostyrene, and vinylpyridine, among which at least one of styrene and α-methylstyrene is preferably used in terms of affinity for the polylactic acid block copolymer.

Examples of the other vinyl monomer include material monomers that form an acrylic vinyl unit having an amino group, such as (meth)acrylic acid, methyl (meth)acrylate, ethyl (meth)acrylate, propyl (meth)acrylate, butyl (meth)acrylate, isobutyl (meth)acrylate, t-butyl (meth)acrylate, 2-ethylhexyl (meth)acrylate, cyclohexyl (meth)acrylate, isobornyl (meth)acrylate, lauryl (meth)acrylate, stearyl (meth)acrylate, hydroxyethyl (meth)acrylate, hydroxypropyl (meth)acrylate, (meth)acrylic acid esters of polyethylene glycol and polypropylene glycol, trimethoxysilylpropyl (meth)acrylate, (meth)acrylonitrile, N,N-dialkyl (meth)acrylamide, α-hydroxymethyl acrylic acid ester, dimethylaminoethyl acrylate, and dimethylaminoethyl methacrylate, among which (meth)acrylic acid, methyl (meth)acrylate, ethyl (meth)acrylate, propyl (meth)acrylate, butyl (meth)acrylate, isobutyl (meth)acrylate, t-butyl (meth)acrylate, 2-ethylhexyl (meth)acrylate, cyclohexyl (meth)acrylate, isobornyl (meth)acrylate, and (meth)acrylonitrile are preferred, and furthermore, (meth)acrylic acid, methyl (meth)acrylate, ethyl (meth)acrylate, butyl (meth)acrylate, 2-ethylhexyl (meth)acrylate, and (meth)acrylonitrile are used. In addition, (meth)acrylamide, (meth)acryldialkylamide, vinyl esters such as vinyl acetate, vinyl ethers, aromatic vinyl monomers of (meth)allyl ethers, and α-olefin monomers such as ethylene and propylene may also be used. These can be used alone or in combination of two or more appropriately selected.

When the polyepoxy compound is an acrylic resin-based reactive compound, the number of epoxy groups contained in one molecule of the compound is preferably 2 to 30, more preferably 3 to 20, and still more preferably 4 to 10. When the average number of epoxy groups is in this preferred range, the poly(lactic acid) resin composition is effectively thickened to have sufficiently improved moldability, mechanical properties, durability, and retention stability during heating, and, in addition, the epoxy groups do not cross-link excessively with carboxyl groups or hydroxyl groups in the poly(lactic acid) resin, leading to good moldability.

In the present invention, when the polyepoxy compound is an acrylic resin-based reactive compound, the epoxy equivalent weight of the compound is preferably 50 to 1,500 (g/mol), more preferably 100 to 1,000 (g/mol), and most preferably 150 to 600 (g/mol) from the viewpoint of reactivity and moldability. The epoxy equivalent weight herein means the weight (in grams) of a polymer containing 1 equivalent of epoxy groups.

From the viewpoint of reactivity and compatibility with resin, the weight average molecular weight (Mw) of the epoxy group-containing acrylic resin-based reactive compound is preferably 1,000 to 15,000, more preferably 2,000 to 10,000. The weight average molecular weight (Mw) is a weight average molecular weight determined by gel permeation chromatography (GPC) against polymethyl methacrylate (PMMA) using hexafluoroisopropanol as a solvent.

In the present invention, the acrylic resin-based reactive compound used can be produced by any known technique, and commercially available products can also be used. Specific examples of the commercially available product that is suitable for use include "BONDFAST" (registered trademark) series available from Sumitomo Chemical Co., Ltd., "MARPROOF" (registered trademark) series available from Nippon Oil & Fats Co., Ltd., "RESEDA" (registered trademark) series and "ARUFON" (registered trademark) series available from Toagosei Co., Ltd., and "JONCRYL" (registered trademark) series available from BASF, and from the viewpoint of reactivity, "ARUFON" (registered trademark) series available from Toagosei Co., Ltd. and "JONCRYL" (registered trademark) series available from BASF are more suitable for use.

In the present invention, it is also preferable to use a cyclic compound having a glycidyl group or acid anhydride as a polyepoxy compound.

In the present invention, the cyclic compound having a glycidyl group or acid anhydride may be contained not only in the poly(lactic acid) resin but also during the production of the above-described polylactic acid block copolymer.

The molecular weight of the cyclic compound having a glycidyl group or acid anhydride is preferably 800 or less, more preferably 600 or less. The lower limit of the molecular weight is not limited but preferably not less than 100.

Among them, at least one compound selected from diallyl monoglycidyl isocyanurate (hereinafter abbreviated as DAMGIC), monoallyl glycidyl isocyanurate (hereinafter abbreviated as MADGIC), triglycidyl isocyanurate (hereinafter abbreviated as TGIC), diglycidyl phthalate, diglycidyl terephthalate, diglycidyl tetrahydrophthalate, diglycidyl hexahydrophthalate, and cyclohexanedimethanol diglycidyl ether is preferred.

The amount of the polyfunctional compound(s) mixed is not limited but preferably 0.01 part by weight to 20 parts by weight based on 100 parts by weight of the total amount of the poly-L-lactic acid component and the poly-D-lactic acid component, more preferably 0.1 part by weight to 10 parts by weight. When the amount of the polyfunctional compound(s) added is in this preferred range, the effect of using the polyfunctional compound(s) can be exerted.

Furthermore, when a polyfunctional compound(s) is/are used, a reaction catalyst(s) may be added for promoting the reaction of the poly-L-lactic acid component and the poly-D-lactic acid component with the polyfunctional compound(s). The reaction catalyst(s) used here may be a reaction catalyst(s) used for promoting the reaction of the poly-L-lactic acid component and the poly-D-lactic acid component with the polyfunctional compound(s) in the method of producing the polylactic acid block copolymer described in Production Method 4.

The amount of the reaction catalyst(s) added is not limited but preferably 0.001 part by weight to 0.5 part by weight based on 100 parts by weight of the total amount of the poly-L-lactic acid component and the poly-D-lactic acid component. When the amount of the catalyst(s) is in this preferred range, the polymerization time is effectively reduced, and, in addition, the final resulting poly(lactic acid) resin can have a large molecular weight.

To the poly(lactic acid) resin of the present invention, commonly used additives may be added as long as the object of the present invention is not adversely affected. Examples of the additives include plasticizers (examples include polyalkylene glycol plasticizers, polyester plasticizers, polycarboxylate plasticizers, glycerin plasticizers, phosphate plasticizers, epoxy plasticizers, fatty acid amides such as stearic acid amide and ethylenebis stearic acid amide, pentaerythritol, various sorbitols, polyacrylates, silicone oil, and paraffins, and from the viewpoint of bleed-out resistance, polyalkylene glycol plasticizers such as polyalkylene glycols including polyethylene glycol, polypropylene glycol, poly(ethylene oxide/propylene oxide) block and/or random copolymers, polytetramethylene glycol, ethylene oxide addition polymers of bisphenols, propylene oxide addition polymers of bisphenols, and tetrahydrofuran addition polymers of bisphenols, and terminal blocked compounds thereof including terminal epoxy-modified compounds, terminal ester-modified compounds, and terminal ether-modified compounds; polycarboxylate plasticizers such as bis(butyl diglycol) adipate, methyl diglycol butyl diglycol adipate, benzyl methyl diglycol adipate, acetyl tributyl citrate, methoxycarbonylmethyl dibutyl citrate, and ethoxycarbonylmethyl dibutyl citrate; glycerin plasticizers such as glycerin monoacetomonolaurate, glycerin diacetomonolaurate, glycerin monoacetomonostearate, glycerin diacetomonooleate, and glycerin monoacetomonomontanate), impact resistance modifiers (examples include natural rubbers, polyethylenes such as low-density polyethylene and high-density polyethylene, polypropylene, impact-resistant polystyrene, polybutadiene, polyester elastomers such as styrene/butadiene copolymers, ethylene/propylene copolymers, ethylene/methyl acrylate copolymers, ethylene/ethyl acrylate copolymers, ethylene/vinyl acetate copolymers, ethylene/glycidyl methacrylate copolymers, polyethylene terephthalate/poly(tetramethylene oxide) glycol block copolymers, and polyethylene terephthalate/isophthalate/poly(tetramethylene oxide) glycol block copolymers, butadiene core-shell elastomers such as MBS, and acrylic core-shell elastomers (these can be used alone or in combination of two or more), and examples of the butadiene or acrylic core-shell elastomers include "Metablen" (registered trademark) available from Mitsubishi Rayon Co., Ltd., "Kane ace" (registered trademark) available from Kaneka Corporation, and "PARALOID" (registered trademark) available from Rohm and Haas), fillers (any fillers such as fibrous fillers, plate-like fillers, powdery fillers, and granular fillers can be used: specifically, fibrous fillers such as glass fibers, carbon fibers such as PAN-based carbon fibers and pitch-based carbon fibers, metal fibers such as stainless-steel fibers, aluminum fibers, and brass fibers, organic fibers such as aromatic polyamide fibers, gypsum fibers, ceramic fibers, asbestos fibers, zirconia fibers, alumina fibers, silica fibers, titanium oxide fibers, silicon carbide fibers, and rock wool; whisker fillers such as potassium titanate whiskers, barium titanate whiskers, aluminum borate whiskers, and silicon nitride whiskers; kaolin, silica, calcium carbonate, glass beads, glass flakes, glass microballoons, molybdenum disulfide, wollastonite, montmorillonite, titanium oxide, zinc oxide, calcium polyphosphate, graphite, and barium sulfate), flame retardants (e.g., red phosphorus, brominated polystyrene, brominated polyphenylene ether, brominated polycarbonate, magnesium hydroxide, melamine, cyanuric acid and salts thereof, and silicon compounds), ultraviolet absorbers (e.g., resorcinol, salicylates, benzotriazole, and benzophenone), heat stabilizers (e.g., hindered phenols, hydroquinone, phosphites, and substitution products thereof), lubricants, mold releasing agents (e.g., montanic acid and its salts, esters, and half-esters, stearyl alcohol, stearamide, and polyethylene wax), coloring agents including dyes (e.g., nigrosine) and pigments (e.g., cadmium sulfide, phthalocyanine), color-protection agents (e.g., phosphites, hypophosphites), conducting agents or coloring agents (e.g., carbon black), sliding property improving agents (e.g., graphite, fluororesins), and antistatic agents. One of these or two or more of these may be added.

The poly(lactic acid) resin of the present invention may further include at least one of other resins such as thermoplastic resins (e.g., polyethylene, polypropylene, polystyrene, acrylic resins, acrylonitrile/butadiene/styrene copolymers, polyamide, polycarbonate, polyphenylene sulfide resins, polyether ether ketone resins, polyester, polysulfone, polyphenylene oxide, polyacetal, polyimide, polyetherimide, cellulose esters), thermosetting resins (e.g., phenolic resins, melamine resins, polyester resins, silicon resins, epoxy resins), and soft thermoplastic resins (e.g., ethylene/glycidyl methacrylate copolymers, polyester elastomers, polyamide elastomers, ethylene/propylene terpolymers, ethylene/butene-1 copolymers) as long as the object of the present invention is not adversely affected.

The thermoplastic resin for use is preferably one which is decomposed by an acid generated from the poly(lactic acid) resin. Polyamide, polyester, and polyacetal are preferred, and polyamide is particularly preferred. The product after decomposition is preferably free of polycarboxylic acid. Preferred polyesters are those having a melting point of 190° C. or higher. Polyglycolic acid, polyethylene terephthalate, polypropylene terephthalate, and polybutylene terephthalate are more preferred, and polyglycolic acid is particularly preferred.

Preferred polyamides are those composed mainly of polycaproamide or polyhexamethylene adipamide. The term "mainly" means that c-caprolactam units constitute 80 mol % or more, more preferably 90 mol % or more, of polycaproamide or that hexamethylene diammonium adipate units constitute 80 mol % or more, more preferably 90 mol % or more, of polyhexamethylene adipamide. Examples of other components include, but are not limited to, units of amino carboxylic acid, dicarboxylic acid, diamine, and the like, which are monomers constituting polydodecanoamide, polyhexamethylene azelamide, polyhexamethylene sebacamide, polyhexamethylene dodecanoamide, polymetaxylylene adipamide, polyhexamethylene terephthalamide, polyhexamethylene isophthalamide, and the like. In particular, polycaproamide is more preferred, and polyamide 6 is particularly preferred.

The method of blending the various additives and the thermoplastic resins of the present invention is not limited, and any known method can be used. From the viewpoint of ease of operation and uniform dispersibility of the additives, blending by melt kneading is preferred.

The method of blending the various additives by melt kneading is not limited, and the melt kneading may be carried out using any known method. Examples of kneading apparatuses include single screw extruders, twin screw extruders, plastomill, kneaders, and stirred tank reactors equipped with a pressure reducing device, and to achieve uniform and sufficient kneading, it is preferable to use a single screw extruder or a twin screw extruder.

The timing of blending the various additives is not limited. The various additives may be blended in advance with raw materials the poly-L-lactic acid component and the poly-D-lactic acid component, may be blended when the poly-L-lactic acid component and the poly-D-lactic acid component are mixed, or may be blended with the poly(lactic acid) resin produced in advance. When the poly(lactic acid) resin is subjected to solid state polymerization, the catalyst deactivator is preferably added after the solid state polymerization because the catalyst is preferably active.

For the temperature conditions for melt kneading, the temperature is preferably in the range of 190° C. to 270° C., more preferably 200° C. to 250° C., and particularly preferably 200 to 240° C. A mixing temperature of higher than 270° C. significantly decreases the molecular weight of the mixture, and a mixing temperature of not higher than 190° C. significantly reduces the flowability, both of which are not preferred.

For the time conditions for mixing, the mixing time is preferably in the range of 0.1 minute to 10 minutes, more preferably 0.3 minute to 5 minutes, and particularly preferably in the range of 0.5 minute to 3 minutes. A mixing time of not longer than 0.1 minute results in ununiform mixing of the various additives, and a mixing time of longer than 10 minutes is likely to cause thermal decomposition after the mixing, both of which are not preferred.

The pressure conditions for mixing are not limited, and the mixing may be carried out either in the air or in an atmosphere of an inert gas such as nitrogen.

In the kneading using an extruder, various additives may be fed by any method, such as a method in which the poly(lactic acid) resin and various additives are fed at one time via a resin hopper or a method in which using a side resin hopper as required, the poly(lactic acid) resin and various additives are separately fed via a resin hopper and the side resin hopper.

The screw element in the extruder preferably includes a kneading element at a mixing section so that the poly(lactic acid) resin and various additives can be uniformly mixed.

The mixture after melt kneading the poly(lactic acid) resin and the various additives may be in any form such as a block, a film, a pellet, and powder, and to allow the steps efficiently proceed, it is preferable to use a pellet or powder. Examples of the method of forming the blending after melt kneading into pellets include a method in which a mixture is extruded into a strand and pelletized and a method in which a mixture is extruded into water and pelletized using an underwater pelletizer. Examples of the method of forming the blending after melt kneading into powder include pulverization using a pulverizer such as a mixer, a blender, a ball mill, or a hammer mill.

The acid value of the poly(lactic acid) resin of the present invention is preferably varied according to the depth and the temperature of the well to be dug or the composition of the proppant to be used.

<Method of Recovering Gaseous Hydrocarbons and/or Liquid Hydrocarbons from Underground>

The method of recovering gaseous hydrocarbons and/or liquid hydrocarbons from underground according to the present invention, the method being characterized by using a poly(lactic acid) resin including a poly-L-lactic acid component and a poly-D-lactic acid component, is a recovery method that uses a poly(lactic acid) resin including a poly-L-lactic acid component and a poly-D-lactic acid component in recovering gaseous and/or liquid hydrocarbons such as shale gas and shale oil from underground, the poly(lactic acid) resin being used as various chemicals including lost circulation materials and used for materials in drilling or recovery.

Examples of the chemicals include breakers for reducing the viscosity of a fluid, biocides for preventing proliferation of bacteria, germs, and the like, clay stabilizers for preventing clay from swelling and entering into a formation, corrosion inhibitors for preventing corrosion of steel pipes and various apparatuses, crosslinkers for efficiently carrying a proppant, friction reducers for improving the flowability of a fluid, gelling agents for efficiently carrying a proppant, proppant flow improvers, proppant antisettling agents for preventing settlement of a proppant, iron content control agents for preventing sedimentation of metal oxides, pH adjusting agents for adjusting the pH of a fluid, scale inhibitors for preventing sedimentation of carbonate and the like, surfactants for reducing the surface tension of a fluid, lost circulation materials for preventing lost circulation, a phenomenon where mud is lost into a highly permeable formation, channel forming agents for forming a channel in a proppant, and channel forming agent solubilizers for dissolving, for example, carbonate for forming a channel in a proppant. In particular, a method is preferred that uses the poly(lactic acid) resin as one or more of the lost circulation materials, proppant flow improvers, channel forming agents, channel forming agent solubilizers, breakers, and pH adjusting agents.

As a principal component of a fluid used for recovery, components such as water and liquid hydrocarbons can be used. In the case of water, the poly(lactic acid) resin is used in the form of an aqueous dispersion, and in the case of liquid hydrocarbons, the poly(lactic acid) resin is used in the form of a liquid hydrocarbon dispersion. The poly(lactic acid) resin is preferably used in the form of an aqueous dispersion.

When the poly(lactic acid) resin is used in the form of an aqueous dispersion, the pH after adding the poly(lactic acid) resin, a proppant, and various chemicals is preferably 6 to 12, particularly preferably 7 to 10.

As the proppant in the present invention, sand, ceramic, bauxite, glass, plastic beads, nutshell, and other materials can be used, and in the recovery at very deep areas, it is preferable to use a proppant including ceramic or bauxite.

A formation suitable for the recovery method of the present invention is a sedimentary rock formation. More suitable are a conglomerate formation, a sand formation, a siltstone formation, a mud stone formation, a shale formation, and Hunsrtick Slate, and particularly suitable is a shale formation.

In the recovery method of the present invention, the poly(lactic acid) resin for use preferably has a decrease rate (A) of weight average molecular weight, as measured in hot water at 150° C. and 30 MPa, satisfying Expression (1) below. When the decrease rate (A) of weight average molecular weight, as measured in hot water at 150° C. and 30 MPa, of the poly(lactic acid) resin for use is in this preferred range, the poly(lactic acid) resin is less likely to remain in the ground for a long period of time after use, and, in addition, is less likely to decompose during use.

$$0.1 < A(\%/\text{min}) < 2 \qquad (1)$$

When the poly(lactic acid) resin is used in the form of a fluid hydrocarbon dispersion, the poly(lactic acid) resin for use preferably has a thermal weight loss rate (B), as measured under anhydrous conditions at 190° C., satisfying Expression (2) below. When the thermal weight loss rate (B), as measured under anhydrous conditions at 190° C., of the poly(lactic acid) resin for use is in this preferred range, the poly(lactic acid) resin is less likely to remain in the ground for a long period of time after use, and, in addition, is less likely to decompose during use.

$$0.01 < B(\text{wt }\%/\text{hr}) < 5 \qquad (2)$$

The weight average molecular weight of the poly(lactic acid) resin for use is preferably 100,000 to 250,000.

In the method of recovering gaseous hydrocarbons and/or liquid hydrocarbons from underground according to the present invention, it is preferable to use a poly(lactic acid) resin in the fiber form or powder form.

When a poly(lactic acid) resin in the fiber form is used, either a filament or a staple can be used, but the staple is preferred. The fiber length and the fiber diameter can be appropriately selected depending on the recovery method, and the cross-section of the fiber may be of any shape, for example, perfectly circular, oval, trilobed, quadrilobed, cross-shaped, hollow, flat, T-shaped, X-shaped, or H-shaped.

The single fiber fineness of the staple is preferably 0.1 to 3,000 dtex, more preferably 0.3 to 800 dtex. The fiber length of the poly(lactic acid) staple fiber of the present invention is preferably in the range of 1 to 150 mm. The elongation is preferably in the range of 10 to 100%, and the strength is preferably 2.0 cN/dtex or more.

The poly(lactic acid) resin may be spun by any method, for example, the following method. The poly(lactic acid) resin is melted in an extruder-type or pressure melter-type melt extruder, weighed with a metering pump, filtered, for example, in a spin pack, and then discharged through a spinneret having a desired shape and a desired number of holes. The yarn discharged is cooled and solidified by passage through a gas at a temperature lower than the melting point of the polymer, and then taken up with a lubricant applied. The yarn is preferably taken up at 300 m/min or higher, more preferably taken up at 1,000 m/min or higher, because increasing the molecular orientation at spinning increases the likelihood of formation of poly(lactic acid) stereocomplex crystals. From the same viewpoint, the spinning draft is preferably 50 or greater. The undrawn yarn taken up is then subjected to drawing. Either the two-step method in which the yarn is once wound up before being drawn or the direct spinning and drawing method in which the yarn is directly drawn without being wound up after being spun and may be used, and from the viewpoint of productivity, the direct spinning and drawing method is preferred.

The drawing may be carried out in one stage or two or more multiple stages, and to increase the strength, drawing in two or more multiple stages is preferred. Subsequently to the drawing, a heat treatment at a temperature about 10 to 80° C. lower than the melting point of the polymer is preferably performed before winding up.

In the present invention, when a poly(lactic acid) resin in the powder form is used, its shape may be spherical, polyhedral, plate-like, dome-like, acicular, or needle-like, and is preferably spherical.

When the poly(lactic acid) resin is used in the powder form, its average particle size is preferably 1 to 1,000 μm, more preferably 10 to 500 μm.

Examples of the method of producing the powder include, but are not limited to, pulverization using a pulverizer such as a mixer, a blender, a ball mill, or a hammer mill.

In the method of recovering gaseous hydrocarbons and/or liquid hydrocarbons from underground according to the present invention, a material including a poly(lactic acid) resin and any other thermoplastic resin can be used, it is preferable to use a material in the fiber form or in the particle form. Examples of the material in the fiber form that can be used include polymer alloy fibers made of a polymer alloy and core-sheath conjugated fibers, and examples of the material in the particle form that can be used include polymer alloy particles made of a polymer alloy and core-shell particles. When the poly(lactic acid) resin is in the fiber form and the other thermoplastic resin is polyamide, the polyamide is preferably contained inside the poly(lactic acid) resin.

Examples of the polymer alloy fibers that can be used include those having a sea-island structure and those having a co-continuous structure. In the case of polymer alloy fibers having a sea-island structure, either those in which the sea component is a poly(lactic acid) resin and the island component is any other thermoplastic resin or those in which the island component is a poly(lactic acid) resin and the sea component is any other thermoplastic resin can be used. When the other thermoplastic resin is polyamide or polyacetal, the poly(lactic acid) resin is preferably the sea component, and when the other thermoplastic resin is polyester, the poly(lactic acid) resin is preferably the island component.

The average diameter of the island component in the polymer alloy fibers is preferably in the range of 5 to 800 nm, more preferably in the range of 10 to 400 nm, and particularly preferably 20 to 200 nm.

The method of producing the polymer alloy fibers of the present invention may be a commonly used melt spinning method and is not limited, but using a spinneret having a discharge hole size larger than the discharge hole size of a spinneret for melt spinning ordinary fibers (fibers other than polymer alloy fibers) such as polyamide fibers is preferred because the shearing stress against the polymer alloy at spinneret discharge holes can be reduced to keep the viscoelasticity balance, leading to improved melt spinnability. Specifically, it is preferable to use a spinneret that can achieve a discharge linear velocity at spinneret discharge holes of the polymer alloy of 20 m/min or lower.

In addition, since the elongational flow of the polymer alloy is likely to be unstable as compared to the yarn cooling in the melt spinning of ordinary fibers such as polyamide fibers, the polymer alloy is preferably rapidly cooled to solidify in order to stabilize the melt spinnability. Specifically, the distance from the spinneret to the starting position of active cooling is preferably 1 to 10 cm.

The polymer alloy fibers of the present invention can be produced by any method such as the direct spinning and drawing method in which a yarn is directly drawn without being wound up after being spun, the high speed spinning method in which the spinning rate is as high as 4,000 m/min or higher and the drawing step is substantially omitted, the combination of these two methods (the high speed direct spinning and drawing method), and the two-step method in which a yarn is once wound up after being spun, and then drawn. To eliminate or minimize the change with time in dimension and physical properties of an undrawn yarn, the spinning rate is preferably 2,000 m/min or higher to develop the fiber structure.

The core-sheath conjugated fibers may be either those in which the sheath is a poly(lactic acid) resin and the core is any other thermoplastic resin or those in which the core is a poly(lactic acid) resin and the sheath is any other thermoplastic resin. Those in which the sheath is a poly(lactic acid) resin and the core is any other thermoplastic resin are preferred. Those in which the core is a polyamide resin and the sheath is a poly(lactic acid) resin are more preferred. Those in which the core is a polyamide 6 resin and the sheath is a poly(lactic acid) resin are particularly preferred.

The method of producing the core-sheath conjugated fibers is not limited, and the fibers themselves can be produced by a commonly used conjugated fiber spinning method (melt spinning). The cross-section of the core-sheath conjugated fiber can be freely determined by the discharge shape of the spinneret, and it may be of any shape such as concentric, eccentric, modified (core component) and round (sheath component), and modified (core component, sheath component) provided that the core component is not exposed. For the production method using melt spinning, a single-step method, such as the high speed spinning method (in which the spinning rate is as high as 4,000 m/min or higher and the drawing step is substantially omitted, for production of partially-oriented yarn (POY)) or the high speed spinning and drawing method (in which the spinning step and the drawing step are carried out successively), is preferably used rather than the two-step method (in which an undrawn yarn is once wound up and then drawn).

In the case of concentric core-sheath conjugated fibers, for example, a poly(lactic acid) resin and any other thermoplastic resin are melted separately, weighed at a predetermined conjugation ratio (% by weight), flown into separate spin packs, joined at a spinneret, and discharged through the spinneret with its cross-section formed into a concentric core-sheath conjugated shape. The concentric core-sheath conjugated fibers discharged through the spinneret are cooled, solidified, taken up, and then wound up substantially without being drawn (in the case of POY) or wound up after being drawn at a draw ratio set appropriately such that the elongation is in the range of 35 to 65% (in the case of a drawn yarn) to completion.

As the fibers described above, either a filament or a staple can be used, but the staple is preferred. The fiber length and the fiber diameter can be appropriately selected depending on the recovery method, and the cross-section of the fiber may be of any shape, for example, perfectly circular, oval, trilobed, quadrilobed, cross-shaped, hollow, flat, T-shaped, X-shaped, or H-shaped.

The single fiber fineness of the staple is preferably 0.1 to 3,000 dtex, more preferably 0.3 to 800 dtex. The fiber length of the poly(lactic acid) staple fiber of the present invention is preferably in the range of 1 to 150 mm. The elongation is preferably in the range of 10 to 100%, and the strength is preferably 2.0 cN/dtex or more.

The recovery method of the present invention includes a method using a poly(lactic acid) resin as a lost circulation material. In a drilling process of gas/oil drilling, a fluid called mud is usually used, and at a formation having cavities and cracks or a highly permeable formation, the mud causes lost circulation, a phenomenon where the mud is diffused and lost into the formation. The lost circulation material is a countermeasure against this, which causes accumulation or clogging in the cracks and the like to prevent the mud from diffusing into the formation. This method uses a poly(lactic acid) resin including a poly-L-lactic acid component and a poly-D-lactic acid component as a lost circulation material, and according to this method, clogging is efficiently caused even in very deep areas, and the influence on the environment can be small because the poly(lactic acid) resin decomposes in the presence of water. The poly(lactic acid) resin, when used as a lost circulation material, may be of various shapes such as particule form, fiber form, and flake form, and may be used in combination of two or more types.

In the method of the present invention, the poly(lactic acid) resin is preferably used particularly in the fiber form or in the particle form. The poly(lactic acid) resin in the fiber form preferably has a length of 1 to 5 cm and a fineness of 100 to 1,000 dtex, more preferably has a length of 1 to 3 cm and a fineness of 100 to 800 dtex. The poly(lactic acid) resin in the particle form preferably has an average particle size of 10 to 400 mesh, more preferably 50 to 200 mesh.

The amount of mud added to the poly(lactic acid) resin is preferably 1 to 10 parts by weight based on 100 parts by weight of the mud, more preferably 2 to 6 parts by weight.

The recovery method of the present invention includes a method using a poly(lactic acid) resin including a poly-L-lactic acid component and a poly-D-lactic acid component as a proppant flow improver. The proppant, which is a material used in hydraulic fracturing in which a large amount of water is fed into a drilled well under high pressure to create fractures in a shale formation, enters the fractures to prevent the crevice from closing to thereby help gas and liquid flow out. This proppant requires appropriate flowability to enter the crevice evenly, and this method uses the poly(lactic acid) resin including a poly-L-lactic acid component and a poly-D-lactic acid component as a flow improver for water containing the proppant. The poly(lactic acid) resin, when used as a proppant flow improver, may be of various forms such as particle form, fiber form, and flake form, and may be used in combination of two or more form types. The recovery method of the present invention includes a method using a poly(lactic acid) resin including a poly-L-lactic acid component and a poly-D-lactic acid component as a proppant antisettling agent. The proppant is likely to settle and thus can fail to uniformly enter the fractures formed by hydraulic fracturing, and this is a method for recovering hydrocarbons using the poly(lactic acid) resin to prevent settlement of the proppant. The poly(lactic acid) resin, when used as a proppant antisettling agent, may be of various forms such as particle form, fiber form, and flake form, and may be used in combination of two or more form types. Using the poly(lactic acid) resin in the form of fibers produces a greater effect.

The recovery method of the present invention includes a method using a poly(lactic acid) resin including a poly-L-lactic acid component and a poly-D-lactic acid component as a channel forming agent in a proppant. The proppant facilitates the flow of gas and a channel, but the proppant is compressed under high pressure during fracturing, as a result of which a sufficient channel may not be formed after the pressure is removed. However, when the poly(lactic acid) is used with the proppant, the poly(lactic acid) enters the proppant and is decomposed away in the presence of high-temperature water after the pressure is removed, as a result of which a sufficient channel is formed in the proppant to facilitate the flow of gas and liquid. The poly(lactic acid) resin, when used as a channel forming agent, may be of various forms such as particle form, fiber form, and flake form, and may be used in combination of two or more form types.

The recovery method of the present invention includes a method using a poly(lactic acid) resin including a poly-L-lactic acid component and a poly-D-lactic acid component as a channel forming agent solubilizer in a proppant. The method in the above paragraph uses a poly(lactic acid) resin as a channel forming agent, and when acid-soluble inorganic particles are used as a channel forming agent, as a result of the combined use with the poly(lactic acid) resin, an acid resulting from decomposition of the poly(lactic acid) resin decomposes the inorganic particles to form a sufficient channel in the proppant. The poly(lactic acid) resin, when used as a channel forming agent solubilizer, may be of various forms such as particle form, fiber form, and flake form, and may be used in combination of two or more form types.

The recovery method of the present invention includes a method using a poly(lactic acid) resin including a poly-L-lactic acid component and a poly-D-lactic acid component as a breaker. The breaker gradually breaks a polymer chain used as a thickener of a fracturing fluid to reduce the viscosity of the fluid. Specifically, an acid resulting from decomposition of the poly(lactic acid) resin breaks the polymer chain to produce this effect. The poly(lactic acid) resin, when used as a breaker, may be of various forms such as particle form, fiber form, and flake form, and may be used in combination of two or more form types.

In the present invention, the poly(lactic acid) resin, when used as a proppant flow improver, a proppant antisettling agent, a channel forming agent in a proppant, or a channel forming agent solubilizer in a proppant, preferably used particularly in the fiber form or in the flake form. The poly(lactic acid) resin in the fiber form preferably has a length of 0.5 to 20 mm and a fineness of 0.1 to 10 dtex, more preferably a length of 1 to 10 mm and a fineness of 0.3 to 5 dtex. The poly(lactic acid) resin in the flake form preferably has an average particle size of 100 to 400 mesh, more preferably 100 to 200 mesh.

The amount of the poly(lactic acid) resin added to mud is preferably 1 to 10 parts by weight based on 100 parts by weight of a fracturing fluid, more preferably 1 to 6 parts by weight.

In the present invention, when the poly(lactic acid) resin is used as a proppant flow improver, a proppant antisettling agent, a channel forming agent in a proppant, or a channel forming agent solubilizer in a proppant, the poly(lactic acid) resin for use preferably has a weight average molecular weight of 100,000 to 250,000 and is used in the form of an aqueous dispersion, wherein a retention time in the form of an aqueous dispersion in the formation, for a formation temperature where gaseous hydrocarbons and/or liquid hydrocarbons are recovered, satisfy Expression (4) below.

$$323{,}000 \times e^{-0.0618 \times Ts} < H < 42{,}000{,}000 \times e^{-0.0745 \times Ts} \qquad (4)$$

Ts: Formation temperature (° C.)

H: Retention time in the form of an aqueous dispersion (min)

When the retention time is in this preferred range, the outflow and movement of gaseous hydrocarbons and/or liquid hydrocarbons will not be impeded because of sufficient hydrolysis, and, in addition, the poly(lactic acid) will not decompose and can exhibit its primary function.

When a liquid hydrocarbon such as liquefied natural gas is used as a fluid in place of water, water for hydrolysis can be insufficient, in which case hydrolysis cannot proceed to impede the outflow and movement of gaseous hydrocarbons and/or liquid hydrocarbons. Thus, when the poly(lactic acid) resin is used in the form of a liquid hydrocarbon dispersion as a proppant flow improver, a proppant antisettling agent, a channel forming agent in a proppant, or a channel forming agent solubilizer in a proppant, the poly(lactic acid) resin for use preferably has a weight average molecular weight of 100,000 to 250,000, a decrease rate (A) of weight average molecular weight, as measured in hot water at 150° C. and 30 MPa, satisfying Expression (1) above, and a thermal weight loss rate (B), as measured under anhydrous conditions at 190° C., satisfying Expression (2) above.

$$0.1 < A(\%/min) < 2 \qquad (1)$$

$$0.01 < B(\text{wt }\%/hr) < 5 \qquad (2)$$

The method of recovering gaseous hydrocarbons and/or liquid hydrocarbons from underground according to the present invention may be performed underground at any depth, but the underground is preferably at a depth of 3,000 m or deeper, more preferably at a depth of 3,500 m or deeper, and particularly preferably at a depth of 4,000 m or deeper. The underground is preferably at a depth not deeper than 6,000 m, more preferably at a depth not deeper than 5,000 m.

The method of recovering gaseous hydrocarbons and/or liquid hydrocarbons from underground according to the present invention may be performed underground at any temperature, but the formation temperature is preferably 150° C. or higher, more preferably 160° C. or higher, and particularly preferably 170° C. or higher. The formation temperature is preferably 220° C. or lower, more preferably 210° C. or lower, and particularly preferably 200° C. or lower. The formation pressure is preferably 10 MPa or more, more preferably 20 MPa or more, and particularly preferably 30 MPa or more.

In the present invention, when the poly(lactic acid) resin is used as a lost circulation material, the poly(lactic acid) resin is preferably in the fiber form having a length of 1 to 5 cm and a fineness of 100 to 1,000 dtex. Furthermore, the poly(lactic acid) resin is preferably mixed in an amount of 1 to 10 parts by weight with 100 parts by weight of a mud composed mainly of water and then injected underground together with a fracturing fluid to prevent the fracturing fluid before reaching a shale formation from being lost into formations.

In the present invention, the poly(lactic acid) resin, when used as a proppant flow improver, a proppant antisettling agent, a channel forming agent in a proppant, or a channel forming agent solubilizer in a proppant, is preferably in the fiber form having a length of 1 to 10 mm and a fineness of 0.3 to 5 dtex. Furthermore, the poly(lactic acid) resin is preferably mixed in an amount of 1 to 6 parts by weight with 100 parts by weight of a fracturing fluid composed mainly of water and a proppant and then injected together with the fracturing fluid into fractures in a shale formation.

EXAMPLES

The present invention will now be described with reference to examples, but these examples are not intended to limit the present invention. The parts in the examples are parts by weight. The following methods are employed for measurement of physical properties.

(1) Molecular Weight

The weight average molecular weight and the polydispersity are values determined by gel permeation chromatography (GPC) against poly(methyl methacrylate) standards. The GPC measurement was carried out using a differential refractometer WATERS410 available from WATERS as a detector, a MODEL510 available from WATERS as a pump, and "Shodex" (registered trademark) GPC HFIP-806M and "Shodex" (registered trademark) GPC FIFIP-LG available from SHOWA DENKO K.K. connected in series as a column. The measurement was carried out at a flow rate of 0.5 mL/min, and in the measurement, hexafluoroisopropanol was used as a solvent, and 0.1 mL of a solution with a sample concentration of 1 mg/mL was injected.

(2) Thermal Properties

The melting point, the melting end temperature, and the heat of fusion were measured with a differential scanning calorimeter manufactured by Perkin-Elmer Corp. The measurement was carried out using a sample in an amount of 5 mg under a nitrogen atmosphere at a temperature increasing rate of 20° C./min.

The melting point refers to a temperature at the top of a crystal melting peak, and the melting end temperature refers to a temperature at the end of the crystal melting peak. In the results obtained, an increase in melting point (higher melting point) indicates poly(lactic acid) stereocomplex formation, and no change in melting point indicates no poly(lactic acid) stereocomplex formation. The melting point of a mixture as used herein is a melting point observed when the temperature is increased from 30° C. to 250° C. at a temperature increasing rate of 20° C./min as a first temperature increase, whereas the melting point of a polylactic acid block copolymer after solid state polymerization is a melting point observed when the temperature is increased from 30° C. to 250° C. at a temperature increasing rate of 20° C./min as a first temperature increase, decreased to 30° C. at a temperature decreasing rate of 20° C./min, and further increased from 30° C. to 250° C. at a temperature increasing rate of 20° C./min as a second temperature increase.

The parameter value represented by Expression (8) below was calculated as a thermal property.

$$(Tm-Tms)/(Tme-Tm) \qquad (8)$$

In the parameter of Expression (8), $Tm$ represents the melting point (the temperature at the top of a crystal melting peak) derived from crystals of a polylactic acid block copolymer and a poly(lactic acid) stereocomplex (the mixture of poly-L-lactic acid and poly-D-lactic acid);

$Tms$ represents the melting start temperature of the polylactic acid block copolymer and the poly(lactic acid) stereocomplex (the mixture of poly-L-lactic acid and poly-D-lactic acid); and $Tme$ represents the melting end temperature of the polylactic acid block copolymer and the poly(lactic acid) stereocomplex (the mixture of poly-L-lactic acid and poly-D-lactic acid).

These values were determined using a sample of 5 mg under a nitrogen atmosphere with a differential scanning calorimeter manufactured by Perkin-Elmer Corp. The values used are values observed in the temperature range from 190° C. to lower than 250° C. when the temperature is increased from 30° C. to 250° C. at a temperature increasing rate of 40° C./min as a first temperature increase, decreased to 30° C. at a temperature decreasing rate of 40° C./min, and further increased from 30° C. to 250° C. at a temperature increasing rate of 40° C./min as a second temperature increase.

(3) Degree of Stereocomplexation (Sc)

The degree of stereocomplexation (Sc) of a poly(lactic acid) resin composition was calculated by Expression (5) below.

$$Sc=\Delta Hh/(\Delta Hl+\Delta Hh)\times 100 \qquad (5)$$

In the expression, $\Delta Hl$ represents the heat of fusion of crystals of poly-L-lactic acid alone and crystals of poly-D-lactic acid alone, which appears at 150° C. to lower than 190° C., and ΔHh represents the heat of fusion of stereocomplex crystals, which appears at 190° C. to lower than 250° C.

The degree of stereocomplexation (Sc) of a poly(lactic acid) resin composition in the examples was calculated from a crystal melting peak observed during the second temperature increase using a differential scanning calorimeter (DSC).

(4) Crystallization Enthalpy (ΔHc)

The crystallization enthalpy is a peak area of a crystal melting peak determined using a differential scanning calorimeter manufactured by Perkin-Elmer Corp.

(5) Hydrolyzability

A hydrolysis test was carried out by loading a poly(lactic acid) resin into a pressure container, feeding preliminarily hot water heated under pressure by a pump to a predetermined temperature and pressure, followed by treatment for a predetermined time, and then carrying out cooling by feeding cold water into the container by a pump while discharging the hot water.

The hydrolysis treatment was carried out at 180° C. and 30 MPa for 3 minutes, and shape retention was visually observed.

Furthermore, the hydrolysis treatment was carried out in hot water at 150° C. and 30 MPa for 30 minutes, and the decrease rate of weight average molecular weight (%/min) was determined from the rate of decrease in weight average molecular weight.

(6) Thermal Weight Loss Rate

The thermal weight loss rate (wt %/hr) was determined using a TGA manufactured by Texas Instruments Incorporated under a stream of nitrogen at 190° C.

The poly-L-lactic acids and the poly-D-lactic acids used in the examples (Examples 1 to 24 and Comparative Examples 1 to 3) are as described below.

PLA1: Poly-L-lactic acid obtained in Reference Example 1 (Mw=135,000, polydispersity: 1.8)

PLA2: Poly-L-lactic acid obtained in Reference Example 2 (Mw=200,000, polydispersity: 1.9)

PDA1: Poly-D-lactic acid obtained in Reference Example 3 (Mw=35,000, polydispersity: 1.5)

PDA2: Poly-D-lactic acid obtained in Reference Example 4 (Mw=60,000, polydispersity: 1.6)

PDA3: Poly-D-lactic acid obtained in Reference Example 5 (Mw=126,000, polydispersity: 1.7)

PDA4: Poly-D-lactic acid obtained in Reference Example 6 (Mw=198,000, polydispersity: 1.8)

Reference Example 1

In a reaction vessel equipped with an agitator and a reflux condenser, 50 parts of a 90% aqueous L-lactic acid solution was placed, and the temperature was increased to 150° C., after which the solution was allowed to react for 3.5 hours while gradually reducing the pressure to evaporate water. Thereafter, the pressure was adjusted to normal pressure under a nitrogen atmosphere, and 0.02 part of stannous acetate was added, after which a polymerization reaction was carried out for 7 hours while reducing the pressure gradually to 13 Pa at 170° C. Subsequently, the resulting poly-L-lactic acid was crystallized at 110° C. for 1 hour under a nitrogen atmosphere and then subjected to solid state polymerization under a pressure of 60 Pa at 140° C. for 3 hours, at 150° C. for 3 hours, and at 160° C. for 12 hours to give a poly-L-lactic acid (PLA1). The PLA1 had a weight average molecular weight of 135,000, a polydispersity of 1.8, and a melting point of 168° C.

Reference Example 2

The poly-L-lactic acid was polymerized in the same manner as in Reference Example 1 except that the time for the solid state polymerization at 160° C. was changed to 18 hours to give a PLA2. The PLA2 had a weight average molecular weight of 200,000, a polydispersity of 1.9, and a melting point of 172° C.

Reference Example 3

In a reaction vessel equipped with an agitator and a reflux condenser, 50 parts of a 90% aqueous D-lactic acid solution was placed, and the temperature was increased to 150° C., after which the solution was allowed to react for 3.5 hours while gradually reducing the pressure to evaporate water. Thereafter, the pressure was adjusted to normal pressure under a nitrogen atmosphere, and 0.02 part of stannous acetate was added, after which a polymerization reaction was carried out for 7 hours while reducing the pressure gradually to 13 Pa at 170° C. Subsequently, the resulting poly-D-lactic acid was crystallized at 110° C. for 1 hour under a nitrogen atmosphere and then subjected to solid state polymerization under a pressure of 60 Pa at 140° C. for 3 hours, at 150° C. for 3 hours, and at 160° C. for 5 hours to give a poly-D-lactic acid (PDA1). The PDA1 had a weight average molecular weight of 35,000, a polydispersity of 1.5, and a melting point of 155° C.

Reference Example 4

The poly-D-lactic acid was polymerized in the same manner as in Reference Example 3 except that the time for the solid state polymerization at 160° C. was changed to 7 hours to give a PDA2. The PDA2 had a weight average molecular weight of 60,000, a polydispersity of 1.6, and a melting point of 160° C.

Reference Example 5

The poly-D-lactic acid was polymerized in the same manner as in Reference Example 3 except that the time for the solid state polymerization at 160° C. was changed to 12 hours to give a PDA3. The PDA3 had a weight average molecular weight of 126,000, a polydispersity of 1.7, and a melting point of 165° C.

Reference Example 6

The poly-D-lactic acid was polymerized in the same manner as in Reference Example 3 except that the time for the solid state polymerization at 160° C. was changed to 18 hours to give a PDA4. The PDA4 had a weight average molecular weight of 198,000, a polydispersity of 1.8, and a melting point of 170° C.

(A) Poly(Lactic Acid) Resin

A-1: Poly(lactic acid) stereocomplex obtained in Reference Example 7 (the mixture of poly-L-lactic acid and poly-D-lactic acid) (Mw=130,000, polydispersity: 2.6)

A-2: Polylactic acid block copolymer obtained in Reference Example 8 (Mw=160,000, polydispersity: 2.3)

A-3: Poly(lactic acid) stereocomplex obtained in Reference Example 9 (the mixture of poly-L-lactic acid and poly-D-lactic acid) (Mw=170,000, polydispersity: 2.2)

A-4: Polylactic acid block copolymer obtained in Reference Example 10 (Mw=150,000, polydispersity 1.8)

A-5: Poly(lactic acid) stereocomplex obtained in Reference Example 11 (the mixture of poly-L-lactic acid and poly-D-lactic acid) (Mw=90,000, polydispersity: 2.4)

A-6: Polylactic acid block copolymer obtained in Reference Example 12 (Mw=110,000, polydispersity: 2.0)

A-7: Poly(lactic acid) stereocomplex obtained in Reference Example 13 (the mixture of poly-L-lactic acid and poly-D-lactic acid) (Mw=110,000, polydispersity: 1.9)

A-8: Polylactic acid block copolymer obtained in Reference Example 14 (Mw=130,000, polydispersity: 1.7)

A-9: Poly(lactic acid) complex obtained in Reference Example 15 (the mixture of poly-L-lactic acid and poly-D-lactic acid) (Mw=150,000, polydispersity 1.8)

A-10: Polylactic acid block copolymer obtained in Reference Example 16 (Mw=180,000, polydispersity: 1.6)

PLA2: Poly-L-lactic acid obtained in Reference Example 2 (Mw=200,000, polydispersity 1.9) PDA5: Poly-D-lactic acid (Mw=300,000, polydispersity 2.1)

Reference Example 7

Before being mixed, the PLA2 obtained in Reference Example 2 and the PDA1 obtained in Reference Example 3 were crystallized in advance at 110° C. for 2 hours under a nitrogen atmosphere. Subsequently, 70 parts by weight of the crystallized PLA2 and 30 parts by weight of the PDA 1 were melt mixed in such a manner that the PLA2 was fed to a twin screw extruder through a resin hopper, and the PDA1 was fed through a side resin hopper disposed at the position of L/D=30 described below. The twin screw extruder has a plasticizing portion set at 190° C. at the position of L/D=10 relative to the resin hopper and also a screw equipped with a kneading disc at the position of L/D=30 which is capable of applying shear, which structure enables mixing under shearing. The PLA2 and the PDA1 were melt kneaded in the twin screw extruder under reduced pressure at a kneading temperature of 210° C. to give a poly(lactic acid) stereocomplex (A-1). The poly(lactic acid) stereocomplex (A-1) had a weight average molecular weight of 130,000, a polydispersity of 2.6, melting points at double peaks of 215° C. and 153° C., and a degree of stereocomplexation of 97%.

Reference Example 8

The poly(lactic acid) stereocomplex (A-1) obtained in Reference Example 7 was crystallized at 110° C. for 1 hour under a nitrogen atmosphere and then subjected to solid state polymerization under a pressure of 60 Pa at 140° C. for 3 hours, at 150° C. for 3 hours, and at 160° C. for 18 hours to give a polylactic acid block copolymer (A-2). The polylactic acid block copolymer (A-2) had a weight average molecular weight of 160,000, a polydispersity of 2.3, melting points at double peaks of 211° C. and 171° C., and a degree of stereocomplexation of 98%.

Reference Example 9

The melt kneading was carried out in the same manner as in Reference Example 7 except that the amounts of the PLA2 and the PDA3 fed to the twin screw extruder were 50 parts by weight and 50 parts by weight, respectively, to give a poly(lactic acid) stereocomplex (A-3). The poly(lactic acid) stereocomplex (A-3) had a weight average molecular weight of 170,000, a polydispersity of 2.2, a melting point of 211° C., and a degree of stereocomplexation of 100%.

Reference Example 10

In a reaction vessel equipped with an agitator, 100 parts of L-lactide and 0.15 part of ethylene glycol were uniformly dissolved under a nitrogen atmosphere at 160° C., after which 0.01 part of stannous octoate was added, and a ring-opening polymerization reaction was carried out for 2 hours. After completion of the polymerization reaction, the reactant was dissolved in chloroform and reprecipitated in methanol (in an amount 5 times that of the chloroform solution) with stirring, and unreacted monomers were removed to give a poly-L-lactic acid (PLA3). The PLA3 had a weight average molecular weight of 80,000, a polydispersity of 1.6, and a melting point of 168° C.

Subsequently, 100 parts of the PLA3 obtained was dissolved in a reaction vessel equipped with an agitator under a nitrogen atmosphere at 200° C., after which 120 parts of D-lactide and 0.01 part of stannous octoate were added thereto, and a polymerization reaction was carried out for 3 hours. The reactant obtained was dissolved in chloroform and reprecipitated in methanol (in an amount 5 times that of the chloroform solution) with stirring, and unreacted monomers were removed to give a polylactic acid block copolymer (A-4) having three segments, in which segments composed of D-lactic acid units were bound to the PLA3 composed of L-lactic acid units. A-4 had a molecular weight of 150,000, a polydispersity of 1.8, melting points at double peaks of 209° C. and 171° C., and a degree of stereocomplexation of 95%. The weight average molecular weight ratio of the segment composed of L-lactic acid units to the segment composed of D-lactic acid units constituting the polylactic acid block copolymer A-5 was 2.7.

Reference Example 11

The melt kneading was carried out in the same manner as in Reference Example 7 except that the PLA2 fed to the twin screw extruder was changed to the PLA1 to give a poly(lactic acid) stereocomplex (A-5). A-5 had a weight average molecular weight of 90,000, a polydispersity of 2.4, a melting point of 214° C., and a degree of stereocomplexation of 100%.

Reference Example 12

The poly(lactic acid) stereocomplex (A-5) obtained in Reference Example 11 was subjected to solid state polymerization in the same manner as in Reference Example 8 to give a polylactic acid block copolymer (A-6). A-6 had a weight average molecular weight of 110,000, a polydispersity of 2.0, a melting point of 212° C., and a degree of stereocomplexation of 100%.

Reference Example 13

The melt kneading was carried out in the same manner as in Reference Example 7 except that the PLA2 and the PDA1 fed to the twin screw extruder were changed to the PLA1 and the PDA3, respectively, to give a poly(lactic acid) stereocomplex (A-7). A-7 had a weight average molecular weight of 110,000, a polydispersity of 1.9, melting points at double peaks of 213° C. and 165° C., and a degree of stereocomplexation of 68%.

Reference Example 14

The poly(lactic acid) stereocomplex (A-7) obtained in Reference Example 13 was subjected to solid state polymerization in the same manner as in Reference Example 8 to give a polylactic acid block copolymer (A-8). A-8 had a weight average molecular weight of 130,000, a polydispersity of 1.7, melting points at double peaks of 210° C. and 168° C., and a degree of stereocomplexation of 73%.

Reference Example 15

The melt kneading was carried out in the same manner as in Reference Example 7 except that the PDA1 fed to the twin screw extruder was changed to the PDA2 to give a poly(lactic acid) stereocomplex (A-9). A-9 had a weight average molecular weight of 150,000, a polydispersity of 1.8, melting points at double peaks of 210° C. and 158° C., and a degree of stereocomplexation of 90%.

Reference Example 16

The poly(lactic acid) stereocomplex (A-9) obtained in Reference Example 15 was subjected to solid state polymerization in the same manner as in Reference Example 8 to give a polylactic acid block copolymer (A-10). A-10 had a weight average molecular weight of 180,000, a polydispersity of 1.6, melting points at double peaks of 209° C. and 170° C., and a degree of stereocomplexation of 95%.

(B) Phosphorous Compounds
  B-1: Sodium dihydrogen phosphate (Wako Pure Chemical Industries, Ltd.)
  B-2: Phosphoric acid ester aluminum salt ("ADK STAB" (registered trademark) NA-21 available from ADEKA CORPORATION)
  B-3: Dioctadecyl phosphate ("ADK STAB" (registered trademark) AX-71 available from ADEKA CORPORATION)
(C) Polyfunctional Compound
  C-1: Triglycidyl isocyanurate Examples 1 to 17

A poly(lactic acid) resin (A), a phosphorous compound (B), and a polyfunctional compound (C) were dry blended in advance at various ratios shown in Table 1 and Table 2 and then melt mixed in a twin screw extruder having a vent. The twin screw extruder, as described above, has a plasticizing portion set at 225° C. at the position of L/D=10 relative to the resin hopper and a screw equipped with a kneading disc at the position of L/D=30 which is capable of applying shear, which structure enables mixing under shearing. Using this twin screw extruder, melt kneading was performed under reduced pressure at a kneading temperature of 220° C. to give a pelletized poly(lactic acid) resin composition. The physical properties of the poly(lactic acid) resin compositions obtained by melt kneading are as shown in Table 1 and Table 2.

TABLE 1

| | | Example 1 | Example 2 | Example 3 | Example 4 | Example 5 |
|---|---|---|---|---|---|---|
| Poly (lactic acid) resin (A) | Type | A-1 | A-1 | A-1 | A-2 | A-2 |
| | additive amount (Parts by weight) | 100 | 100 | 100 | 100 | 100 |
| Phophorous compound (B) | Type | B-1 | B-1 | B-1 | B-1 | B-1 |
| | additive amount (Parts by weight) | 0.01 | 0.05 | 0.2 | 0.01 | 0.05 |
| Polyfunctional compound (C) | Type | — | — | — | — | — |
| | additive amount (Parts by weight) | — | — | — | — | — |
| Weight average molecular weight | | 130,000 | 130,000 | 130,000 | 150,000 | 160,000 |
| Polydispersity | | 2.5 | 2.6 | 2.6 | 2.2 | 2.2 |
| Melting point | ° C. | 213/152 | 215/153 | 215/153 | 210 | 211/171 |
| (Tm − Tms)/(Tme − Tm) | | 1.9 | 1.8 | 1.8 | 1.4 | 1.3 |
| Sc | % | 95 | 97 | 98 | 100 | 98 |
| Cooling Crystallization Temperature | ° C. | 122 | 125 | 131 | 138 | 139 |
| ΔHc | J/g | 21 | 24 | 23 | 25 | 27 |
| Thermal Weight Loss Rate | wt %/hr | 4.2 | 2.5 | 0.02 | 3.9 | 1.9 |
| Hydrolyzability (shape retention) | | retained | retained | retained | retained | retained |
| Hydrolyzability (decrease rate in molecular weight) | %/min | 1.8 | 1.7 | 1.9 | 1.7 | 1.7 |

| | | Example 6 | Example 7 | Example 8 | Example 9 | Example 10 |
|---|---|---|---|---|---|---|
| Poly (lactic acid) resin (A) | Type | A-2 | A-3 | A-4 | A-5 | A-6 |
| | additive amount (Parts by weight) | 100 | 100 | 100 | 100 | 100 |
| Phophorous compound (B) | Type | B-1 | B-1 | B-1 | B-1 | B-1 |
| | additive amount (Parts by weight) | 0.2 | 0.06 | 0.05 | 0.05 | 0.05 |
| Polyfunctional compound (C) | Type | — | — | — | — | — |
| | additive amount (Parts by weight) | — | — | — | — | — |
| Weight average molecular weight | | 160,000 | 170,000 | 150,000 | 90,000 | 110,000 |
| Polydispersity | | 2.3 | 1.6 | 1.8 | 2.4 | 2.0 |
| Melting point | ° C. | 211 | 217 | 209/171 | 214 | 212 |
| (Tm − Tms)/(Tme − Tm) | | 1.4 | 1.8 | 1.6 | 1.8 | 1.6 |

TABLE 1-continued

| | | | | | | |
|---|---|---|---|---|---|---|
| Sc | % | 100 | 97 | 95 | 100 | 100 |
| Cooling Crystallization Temperature | ° C. | 145 | 121 | 125 | 128 | 145 |
| ΔHc | J/g | 30 | 25 | 21 | 25 | 36 |
| Thermal Weight Loss Rate | wt %/hr | 0.03 | 0.09 | 0.07 | 0.07 | 0.07 |
| Hydrolyzability (shape retention) | | retained | retained | retained | retained | retained |
| Hydrolyzability (decrease rate in molecular weight) | %/min | 1.8 | 1.6 | 1.8 | 2.1 | 1.9 |

Comparative Examples 1 to 3

Similarly to Examples 1 to 17, a poly(lactic acid) resin (A), a phosphorous compound (B), and a polyfunctional compound (C) were dry blended in advance at various ratios shown in Table 2 and then melt mixed in a twin screw extruder having a vent. Also in Comparative Examples 1 to 3, pelletized poly(lactic acid) resin compositions were obtained using the above-described twin screw extruder. The physical properties of the poly(lactic acid) resin compositions obtained by melt kneading are as shown in Table 2.

TABLE 2

| | | Example 11 | Example 12 | Example 13 | Example 14 | Example 15 |
|---|---|---|---|---|---|---|
| Poly (lactic acid) resin (A) | Type | A-7 | A-8 | A-9 | A-10 | A-2 |
| | additive amount (Parts by weight) | 100 | 100 | 100 | 100 | 100 |
| Phophorous compound (B) | Type | B-1 | B-1 | B-1 | B-1 | B-2 |
| | additive amount (Parts by weight) | 0.05 | 0.05 | 0.05 | 0.05 | 0.05 |
| Polyfunctional compound (C) | Type | — | — | — | — | — |
| | additive amount (Parts by weight) | — | — | — | — | — |
| Weight average molecular weight | | 110,000 | 130,000 | 150,000 | 180,000 | 150,000 |
| Polydispersity | | 1.9 | 1.7 | 1.8 | 1.6 | 2.1 |
| Melting point | ° C. | 213/165 | 210/168 | 210/158 | 209/170 | 210 |
| (Tm − Tms)/(Tme − Tm) | | 1.9 | 1.8 | 1.8 | 1.5 | 1.5 |
| Sc | % | 68 | 73 | 90 | 95 | 100 |
| Cooling Crystallization Temperature | ° C. | 125 | 130 | 126 | 141 | 132 |
| ΔHc | J/g | 20 | 23 | 20 | 35 | 25 |
| Thermal Weight Loss Rate | wt %/hr | 0.07 | 0.08 | 0.08 | 0.09 | 1.8 |
| Hydrolyzability (shape retention) | | retained | retained | retained | retained | retained |
| Hydrolyzability (decrease rate in molecular weight) | %/min | 1.8 | 1.8 | 1.7 | 1.6 | 1.8 |

| | | Example 16 | Example 17 | Comparative Example 1 | Comparative Example 2 | Comparative Example 3 |
|---|---|---|---|---|---|---|
| Poly (lactic acid) resin (A) | Type | A-2 | A-3 | PLA2 | PDA5 | PLA2 |
| | additive amount (Parts by weight) | 100 | 100 | 100 | 100 | 100 |
| Phophorous compound (B) | Type | B-1 | B-3 | B-1 | B-1 | B-1 |
| | additive amount (Parts by weight) | 0.05 | 0.06 | 0.05 | 0.05 | 0.05 |
| Polyfunctional compound (C) | Type | C-1 | C-1 | — | — | C-1 |
| | additive amount (Parts by weight) | 1 | 1 | — | — | 1 |
| Weight average molecular weight | | 180,000 | 190,000 | 200,000 | 200,000 | 230,000 |
| Polydispersity | | 2.4 | 2.3 | 1.6 | 1.6 | 2.3 |
| Melting point | ° C. | 209/169 | 212/171 | 168 | 171 | 167 |
| (Tm − Tms)/(Tme − Tm) | | 1.4 | 1.9 | — | — | — |
| Sc | % | 95 | 93 | 0 | 0 | 0 |
| Cooling Crystallization Temperature | ° C. | 135 | 129 | ND | ND | ND |
| ΔHc | J/g | 25 | 22 | 0 | 0 | 0 |
| Thermal Weight Loss Rate | wt %/hr | 0.1 | 0.1 | melted | melted | melted |
| Hydrolyzability (shape retention) | | retained | retained | deteriorated | deteriorated | deteriorated |
| Hydrolyzability (decrease rate in molecular weight) | %/min | 0.2 | 0.2 | — | — | — |

Example 18

Using the poly(lactic acid) resin composition obtained in Example 5, a filament yarn having a fineness of 400 dtex was obtained at a spinning temperature of 230° C., a spinning rate of 1,400 m/min, a drawing temperature of 90° C., and a heat treatment temperature of 110° C. The filament yarn obtained was cut to 2 cm to give a cut yarn. The cut yarn obtained, sand, and water were mixed such that the amounts of the cut yarn and sand were 1 wt % and 5 wt %, respectively, to give a water slurry, and then the time for the water slurry to pass over a 5-mm-slitted plate was measured. The transit time was five times as long as when the cut yarn was not used, indicating a suppressed outflow of a fluid.

Example 19

Using the poly(lactic acid) resin composition obtained in Example 8, a filament yarn having a fineness of 2 dtex was obtained at a spinning temperature of 235° C., a spinning rate of 1,400 m/min, a drawing temperature of 90° C., and a heat treatment temperature of 150° C. The filament yarn obtained was cut to 6 mm to give a cut yarn. The cut yarn obtained, a proppant, and water were mixed such that the amounts of the cut yarn and the proppant were 0.5 wt % and 5%, respectively, to give a water slurry. The slurry obtained was placed in a graduated cylinder and allowed to stand for 30 minutes, and then the settlement rate of the proppant was measured. When the cut yarn was not used, 90% or more of the proppant settled, whereas only 20% of the proppant settled when the cut yarn was used, indicating a reduced settlement.

Example 20

Using the poly(lactic acid) resin composition obtained in Example 17, a filament yarn having a fineness of 2 dtex was obtained at a spinning temperature of 235° C., a spinning rate of 1,400 m/min, a drawing temperature of 90° C., and a heat treatment temperature of 150° C. The filament yarn obtained was cut to 6 mm to give a cut yarn. The cut yarn obtained, a proppant, and water were mixed such that the amounts of the cut yarn and the proppant were 0.5 wt % and 5%, respectively, to give a water slurry, and then the slurry was formed into a cake under a pressure of 30 MPa. The cake obtained was heated for 1 hour under the conditions of 30 MPa and 180° C., and then a cross-section was observed under a microscope. No fibers were observed, and a lot of micropores were observed, confirming channel formation.

Example 21

Using the poly(lactic acid) resin composition obtained in Example 7 as a sheath component and polyamide 6 as a core component, the complex of the core component and the sheath component at a ratio of 45c/0/55% (% by weight) was spun at a spinning rate of 1,300 m/min and then drawn to give a core-sheath conjugated filament yarn having a fineness of 2 dtex, after which the yarn was cut to 6 mm to give a cut yarn. The cut yarn obtained, a proppant, and water were mixed such that the amounts of the cut yarn and the proppant were 0.5 wt % and 5%, respectively, to give a water slurry, and then the slurry was formed into a cake under a pressure of 30 MPa. The cake obtained was heated for 5 hours under the conditions of 30 MPa and 180° C., and then a cross-section was observed under a microscope. No fibers were observed, and numbers of micropores were observed, confirming channel formation. In contrast, residual fibers were observed when the cake was heated for 1 hour.

Example 22

In a twin-screw extruder, 70 parts by weight of the poly(lactic acid) resin composition obtained in Example 10 and 30 parts by weight of polyamide 6 were kneaded, and then the mixture was spun at a spinning rate of 1,300 m/min and drawn to give a polymer alloy filament yarn having a fineness of 2 dtex. The filament yarn obtained was cut to 6 mm to give a cut yarn. The cut yarn obtained, a polyamide 6 cut yarn (fineness: 4 dtex, length: 6 mm), a proppant, and water were mixed such that the amounts of the polymer alloy cut yarn, the polyamide 6 cut yarn, and the proppant were 0.3 wt %, 0.2 wt %, and 5%, respectively, to give a water slurry, and then the slurry was formed into a cake under a pressure of 30 MPa. The cake obtained was heated for 5 hours under the conditions of 30 MPa and 180° C., and then a cross-section was observed under a microscope. Some fibers were observed, but numbers of micropores were observed, confirming channel formation.

Example 23

The poly(lactic acid) resin cut yarn obtained in Example 20 was loaded into a pressure container, and then preliminarily hot water heated under pressure was fed by a pump to adjust the temperature and pressure in the container to be a predetermined treatment temperature and 30 MPa, after which the treatment was carried out for a predetermined time, and then cooling was carried out by feeding cold water by a pump while discharging the hot water in the container. The shape retention of fibers in the pressure container was observed. The presence of residual fibers was evaluated as good, and the absence of residual fibers as bad. The results are shown in Table 3.

TABLE 3

| Treatment Temperature (° C.) | 150 | 150 | 150 | 170 | 170 | 170 | 190 | 190 | 190 |
|---|---|---|---|---|---|---|---|---|---|
| Treatment time (min) | 300 | 550 | 700 | 90 | 120 | 150 | 10 | 25 | 40 |
| Shape Retention State | good | good | bad | good | good | bad | good | good | bad |

Example 24

The poly(lactic acid) resin cut yarn obtained in Example 20 was loaded into a pressure vessel, and then preliminarily hot water heated under pressure was fed by a pump to adjust the temperature and pressure in the container to be a predetermined treatment temperature and 30 MPa, after which the treatment was carried out for a predetermined time, and then the hot water in the container was discharged. Subsequently, the heat treatment was carried out for 6 hours while maintaining the temperature. After cooling, the shape retention of fibers in the pressure container was observed. Fibers that failed to retain their shapes under a force were evaluated as good, and fibers that retained their shapes as bad. The results are shown in Table 4.

TABLE 4

| Treatment Temperature (° C.) | 150 | 150 | 150 | 170 | 170 | 170 | 190 | 190 | 190 |
|---|---|---|---|---|---|---|---|---|---|
| Treatment time (min) | 10 | 35 | 60 | 5 | 10 | 15 | 1 | 3 | 5 |
| Shale Retention State | bad | good | good | bad | good | good | bad | good | good |

INDUSTRIAL APPLICABILITY

According to the method of recovering gaseous hydrocarbons and/or liquid hydrocarbons from underground of the present invention, the method being characterized by using a poly(lactic acid) resin including a poly-L-lactic acid component and a poly-D-lactic acid component, shale gas, shale oil, and the like can be recovered efficiently.

The invention claimed is:

1. A method comprising:
injecting underground a poly(lactic acid) resin stereocomplex comprising a poly-L-lactic acid component, and a poly-D-lactic acid component and having a heat of fusion at 190° C. or higher, as measured by differential scanning calorimetry, of 20 J/g or more, wherein the poly(lactic acid) resin decomposes underground,
wherein at least one of the poly-L-lactic acid component and the poly-D-lactic acid component has a weight average molecular weight in the range of 100,000 to 300,000,
wherein said poly(lactic acid) resin stereocomplex is a polylactic acid block copolymer, and
wherein the total number of the segment composed of L-lactic acid units and the segment composed of D-lactic acid units contained in one molecule of the polylactic acid block copolymer is 3 or more.

2. The method of claim 1, wherein the poly(lactic acid) resin for use has a decrease rate (A) of weight average molecular weight, as measured in hot water at 150° C. and 30 MPa, satisfying Expression (1) below:

$$0.1 < A(\%/min) < 2 \quad (1).$$

3. The method of claim 2, wherein the poly(lactic acid) resin for use has a thermal weight loss rate (B), as measured under anhydrous conditions at 190° C., satisfying Expression (2) below:

$$0.01 < B(wt \%/hr) < 5 \quad (2).$$

4. The method of claim 2, wherein the underground is at a depth of 3,000 m or deeper.

5. The method of claim 1, wherein the poly(lactic acid) resin for use has a thermal weight loss rate (B), as measured under anhydrous conditions at 190° C., satisfying Expression (2) below:

$$0.01 < B(wt \%/hr) < 5 \quad (2).$$

6. The method of claim 1, wherein the underground is at a depth of 3,000 m or deeper.

7. The method of claim 1, wherein the underground is a shale formation having a formation temperature of 150° C. or higher.

8. The method of claim 1, wherein the poly(lactic acid) resin is added to a drilling mud as a lost circulation material.

9. The method of claim 8, wherein the poly(lactic acid) resin is a poly(lactic acid) resin in the fiber form and the fiber having a length of 1 to 5 cm and a fineness of 100 to 1,000 dtex.

10. The method of claim 8, wherein the poly(lactic acid) resin is in the fiber form and the fiber having a length of 1 to 5 cm and a fineness of 100 to 1,000 dtex, and 1 to 10 parts by weight of the poly(lactic acid) resin is mixed with 100 parts by weight of a fracturing fluid comprising water and then injected underground together with the fracturing fluid to prevent the fracturing fluid before reaching the shale formation from being lost into formations.

11. The method of claim 1, wherein the poly(lactic acid) resin is used in a water containing proppant, as at least one of a proppant flow improver and a proppant antisettling agent.

12. The method of claim 11, wherein the poly(lactic acid) resin for use has a weight average molecular weight of 100,000 to 250,000 and is used in the form of an aqueous dispersion, wherein a retention time in the form of an aqueous dispersion in the formation, for a formation temperature where gaseous hydrocarbons and/or liquid hydrocarbons are recovered, satisfy Expression (4) below:

$$323,000 \times e^{-0.0618 \times Ts} < H < 42,000,000 \times e^{-0.0745 \times Ts} \quad (4)$$

where
Ts is a formation temperature (° C.); and
H is a retention time in the form of an aqueous dispersion (min).

13. The method of claim 11, wherein the poly(lactic acid) resin is used in the form of a liquid hydrocarbon dispersion, and the poly(lactic acid) resin for use has a weight average molecular weight of 100,000 to 250,000, a decrease rate (A) of weight average molecular weight, as measured in hot water at 150° C. and 30 MPa, satisfying Expression (1) below, and a thermal weight loss rate (B), as measured under anhydrous conditions at 190° C., satisfying Expression (2) below:

$$0.1 < A(\%/min) < 2 \quad (1);$$

$$0.01 < B(wt \%/hr) < 5 \quad (2).$$

14. The method of claim 11, wherein the poly(lactic acid) resin is a poly(lactic acid) resin in the fiber form and the fiber having a length of 1 to 10 mm and a fineness of 0.3 to 5 dtex.

15. The method of claim 11, wherein the poly(lactic acid) resin is in the fiber form and the fiber having a length of 1 to 10 mm and a fineness of 0.3 to 5 dtex, and 1 to 6 parts by weight of the poly(lactic acid) resin is mixed with 100 parts by weight of a fracturing fluid comprising water and a proppant and then injected together with the fracturing fluid into fractures in the shale formation.

16. The method of claim 1, wherein the poly(lactic acid) resin is used as a channel forming agent in a proppant or a channel forming agent solubilizer in a proppant.

17. The method of claim 1, wherein the poly(lactic acid) resin is a poly(lactic acid) stereocomplex having a degree of stereocomplexation (Sc) satisfying Expression (3) below:

$$Sc = \Delta Hh/(\Delta Hl + \Delta Hh) \times 100 \geq 80 \quad (3)$$

where
$\Delta Hh$ is a heat of fusion (J/g) of stereocomplex crystals as measured by differential scanning calorimetry by increasing the temperature at a temperature increasing rate of 20° C/min; and
$\Delta Hl$ is a heat of fusion (J/g) of crystals of poly-L-lactic acid alone and crystals of poly-D-lactic acid alone as measured by differential scanning calorimetry by increasing the temperature at a temperature increasing rate of 20° C/min.

18. The method of claim 1, wherein the poly(lactic acid) resin is used in the fiber form.

19. The method of claim 1, wherein the poly(lactic acid) resin is a poly(lactic acid) resin in the fiber form containing polyamide inside.

20. The method of claim 1, wherein the poly(lactic acid) resin is used in the powder form.

21. The method of claim 1, wherein said poly(lactic acid) resin stereocomplex includes a polyfunctional compound.

22. The method of claim 1, wherein said poly(lactic acid) resin is in fiber form, and wherein said fiber is a polymer alloy fiber made of said poly(lactic acid) resin and a polyamide.

* * * * *